United States Patent
Hayashi et al.

(10) Patent No.: US 11,017,247 B2
(45) Date of Patent: May 25, 2021

(54) TRAFFIC SIGNAL RECOGNITION SYSTEM

(71) Applicant: Toyota Jidosha Kabushiki Kaisha, Toyota (JP)

(72) Inventors: Yusuke Hayashi, Susono (JP); Taichi Kawanai, Susono (JP); Kentaro Ichikawa, Shizuoka-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/875,042

(22) Filed: May 15, 2020

(65) Prior Publication Data
US 2020/0401824 A1     Dec. 24, 2020

(30) Foreign Application Priority Data
Jun. 24, 2019 (JP) .............................. JP2019-116501

(51) Int. Cl.
| | |
|---|---|
| *G06T 7/90* | (2017.01) |
| *G08G 1/01* | (2006.01) |
| *G06K 9/00* | (2006.01) |
| *G08G 1/04* | (2006.01) |

(52) U.S. Cl.
CPC .......... *G06K 9/00825* (2013.01); *G06T 7/90* (2017.01); *G08G 1/0125* (2013.01); *G08G 1/04* (2013.01)

(58) Field of Classification Search
CPC .............................. G06K 9/00825; G06T 7/90
See application file for complete search history.

(56) References Cited

U.S. PATENT DOCUMENTS

| | | | |
|---|---|---|---|
| 8,638,990 B2* | 1/2014 | Kudo ................ | G08G 1/09623 382/104 |
| 9,248,832 B2* | 2/2016 | Huberman .......... | G05D 1/0088 |
| 9,779,314 B1* | 10/2017 | Wendel ............. | G06K 9/00825 |
| 9,779,315 B2* | 10/2017 | Yamanoi ............ | G08G 1/095 |
| 10,139,832 B2* | 11/2018 | Sarkar ................ | B60W 30/00 |
| 10,339,805 B2* | 7/2019 | Yamanoi ............ | B60R 11/04 |
| 10,380,438 B2* | 8/2019 | Fung ................. | G06K 9/00825 |
| 10,614,326 B2* | 4/2020 | Fung ................. | G06K 9/00825 |
| 10,640,129 B2* | 5/2020 | Emura ............... | G08G 1/09 |
| 10,650,257 B2* | 5/2020 | Satyakumar ........ | G06N 3/08 |

(Continued)

FOREIGN PATENT DOCUMENTS

| | | |
|---|---|---|
| JP | 2008-293277 A | 12/2008 |
| JP | 2016-038757 A | 3/2016 |

*Primary Examiner* — Irfan Habib
(74) *Attorney, Agent, or Firm* — Dinsmore & Shohl LLP

(57) ABSTRACT

Camera image information includes an image that is imaged by a camera installed on a vehicle. Lamp pattern information, which is information on a traffic signal having plural lamp parts, indicates a relative positional relationship between the plural lamp parts and an appearance of each lamp part when lighted. A system detects a subject traffic signal around the the vehicle based on the camera image information to acquire traffic signal detection information that indicates at least an appearance of each of plural detected parts of the subject traffic signal. The system compares the traffic signal detection information with the lamp pattern information. The system recognizes a lighting state of the plural lamp parts that is consistent with the appearance of each of the plural detected parts of the subject traffic signal as a lighting state of the subject traffic signal.

6 Claims, 27 Drawing Sheets

(56) References Cited

U.S. PATENT DOCUMENTS

| | | | |
|---|---|---|---|
| 10,789,491 B2* | 9/2020 | Yamanoi | H04N 5/225 |
| 10,798,319 B2* | 10/2020 | Breuer | H04N 5/347 |
| 10,846,546 B2* | 11/2020 | Kawanai | G06K 9/00825 |
| 2012/0249795 A1* | 10/2012 | Ito | G06K 9/00825 |
| | | | 348/148 |
| 2013/0253754 A1 | 9/2013 | Ferguson et al. | |
| 2016/0305794 A1* | 10/2016 | Horita | G01S 5/16 |
| 2019/0087961 A1* | 3/2019 | Tian | B60T 7/12 |
| 2019/0171891 A1* | 6/2019 | Ferguson | B60W 40/00 |
| 2020/0042808 A1* | 2/2020 | Strigel | G06T 7/11 |
| 2020/0134333 A1* | 4/2020 | Vishal | G06K 9/6231 |
| 2020/0269692 A1* | 8/2020 | Saito | G02B 27/01 |

* cited by examiner

<LAMP PATTERN INFORMATION PAT>

| LAMP PART | APPEARANCE WHEN LIGHTED ||
| --- | --- | --- |
| | COLOR | SHAPE |
| L1 | Green | Circle |
| L2 | Yellow | Circle |
| L3 | Red | Circle |
| L4 | Green | Left Arrow |
| L5 | Green | Up Arrow |
| L6 | Green | Right Arrow |
| L1 - L6 | BLACK WHEN UNLIGHTED ||

< TRAFFIC SIGNAL MAP INFORMATION SG_MAP >

| ID | POSITION [X,Y,Z] | ORIENTATION H |
|---|---|---|
| SG1 | | |
| SG2 | | |
| SG3 | | |
| ... | ... | ... |

*Fig. 15*

< LAMP PATTERN DATABASE PAT_DB >

| ID | POSITION [X,Y,Z] | ORIENTATION H | LAMP PATTERN INFORMATION |
|---|---|---|---|
| SG1 | | | PAT1 |
| SG2 | | | PAT2 |
| SG3 | | | PAT3 |
| ... | ... | ... | ... |

*Fig. 16*

TRAFFIC SIGNAL RECOGNITION SYSTEM

CROSS-REFERENCE TO RELATED APPLICATION

This application claims priority to Japanese Patent Application No. 2019-116501 filed on Jun. 24, 2019, the entire contents of which are herein incorporated by reference.

BACKGROUND

Technical Field

The present disclosure relates to a traffic signal recognition system that is applied to a vehicle and recognizes a lighting state of a traffic signal around the vehicle.

Background Art

Patent Literature 1 discloses a method for detecting a traffic signal and its state. The method first scans a target area by using a sensor mounted on a vehicle to obtain information (image) of the target area. Here, the target area is a typical area in which a traffic signal exists. Subsequently, the method detects a traffic signal in the target area information to detect a position of the traffic signal. Furthermore, the method determines a state of the detected traffic signal (e.g., green, yellow, red, or unclear) based on brightness. For example, when green brightness is the highest, it is determined that the state of the detected traffic signal is green.

LIST OF RELATED ART

Patent Literature 1: U.S. Laid-Open Patent Application Publication No. 2013/0253754

SUMMARY

According to the method disclosed in Patent Literature 1, the information (image) of the target area is acquired by the use of the sensor mounted on the vehicle. Then, the lighting state of the traffic signal is recognized through the image analysis. However, there is a limit on accuracy of recognition of the lighting state through the image analysis.

An object of the present disclosure is to provide a technique that can improve accuracy of recognition of a lighting state of a traffic signal around a vehicle.

An aspect of the the present disclosure is directed to a traffic signal recognition system applied to a vehicle.

The traffic signal recognition system includes one or more memory devices and one or more processors.

Camera image information and lamp pattern information are stored in the one or more memory devices.

The camera image information includes an image that is imaged by a camera mounted on the vehicle and indicates a situation around the vehicle.

The lamp pattern information, which is information on a traffic signal having a plurality of lamp parts, indicates a relative positional relationship between the plurality of lamp parts and an appearance of each of the plurality of lamp parts when lighted.

The one or more processors detect a subject traffic signal around the the vehicle based on the camera image information to acquire traffic signal detection information that indicates at least an appearance of each of a plurality of detected parts of the subject traffic signal.

The one or more processors further execute lighting state recognition processing that recognizes a lighting state of the subject traffic signal by comparing the traffic signal detection information with the lamp pattern information.

In the lighting state recognition processing, the one or more processors recognize a lighting state of the plurality of lamp parts that is consistent with the appearance of each of the plurality of detected parts of the subject traffic signal as the lighting state of the subject traffic signal.

According to the above-described aspect of the present disclosure, the traffic signal recognition system detects the subject traffic signal around the the vehicle based on the camera image information to acquire the traffic signal detection information. The traffic signal detection information indicates at least the appearance of each of the plurality of detected parts of the subject traffic signal.

For recognizing the lighting state of the subject traffic signal, the traffic signal recognition system uses not only the traffic signal detection information that is based on the camera image information but also the lamp pattern information that is independent of the camera image information. The lamp pattern information indicates the relative positional relationship between the plurality of lamp parts of the traffic signal and the appearance of each of the plurality of lamp parts when lighted. The traffic signal recognition system compares the traffic signal detection information with the lamp pattern information. Then, the traffic signal recognition system recognizes a lighting state of the plurality of lamp parts that is consistent with the appearance of each of the plurality of detected parts of the subject traffic signal as the lighting state of the subject traffic signal.

As described above, the lighting state of the subject traffic signal is recognized through the comparison between the traffic signal detection information that is based on the camera image information and the lamp pattern information that is independent of the camera image information, and thus the accuracy of recognition is improved. Moreover, in the comparison, an attention is paid not to a single detected part but to the plurality of detected parts of the subject traffic signal, which also contributes to improvement in the accuracy of recognition.

BRIEF DESCRIPTION OF DRAWINGS

FIG. 15 is a conceptual diagram for explaining an example of traffic signal map information in the embodiment of the present disclosure;

FIG. 16 is a conceptual diagram for explaining an example of a lamp pattern database in the embodiment of the present disclosure;

DETAILED DESCRIPTION

Embodiments of the present disclosure will be described below with reference to the attached drawings.

1. Outline 1-1. Traffic Signal Recognition System

Figure 1:
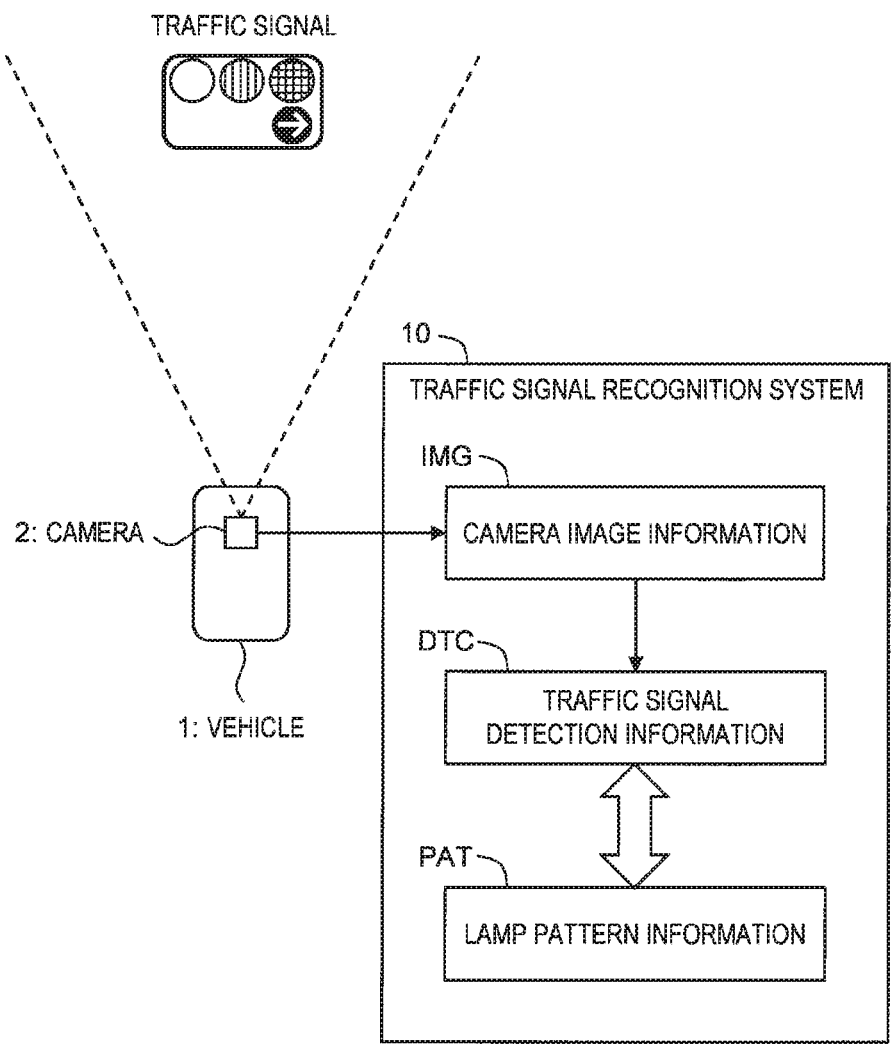
FIG. 1 is a schematic diagram for explaining an outline of an embodiment of the present disclosure.

FIG. 1 is a schematic diagram for explaining an outline of an embodiment of the present disclosure. A vehicle 1 travels on a road. A traffic signal (traffic light) is installed on the road. The vehicle 1 travels in accordance with a lighting state (signal indication) of the traffic signal. In order to achieve automated driving of the vehicle 1, it is desirable to automatically recognize the lighting state of the traffic signal around the vehicle 1.

A traffic signal recognition system 10 is applied to the vehicle 1 and automatically recognizes the lighting state of the traffic signal around the vehicle 1. Typically, the traffic signal recognition system 10 is installed on the vehicle 1. Alternatively, the traffic signal recognition system 10 may be included in an external device outside the vehicle 1 and remotely recognize the lighting state of the traffic signal. Alternatively, the traffic signal recognition system 10 may be distributed to the vehicle 1 and the external device.

The traffic signal recognition system 10 first acquires camera image information IMG. The camera image information IMG is information acquired by a camera (imager) 2 installed on the vehicle 1. The camera 2 images a situation around the vehicle 1. Typically, the camera 2 is placed so as to image a situation ahead of the vehicle 1. The camera image information IMG includes an image imaged by the camera 2, that is, an image indicating the situation around the vehicle 1.

The traffic signal recognition system 10 detects a traffic signal around the vehicle 1 based on the camera image information IMG. An image analysis method for detecting (extracting) a traffic signal from the image imaged by the camera 2 is well-known. The traffic signal detected based on the camera image information IMG is hereinafter referred to as a "subject traffic signal SX." A part (portion) detected in the subject traffic signal SX is hereinafter referred to as a "detected part." Typically, a plurality of detected parts having different colors and/or shapes exist.

Traffic signal detection information DTC is information indicating a result of detection of the subject traffic signal SX. For example, the traffic signal detection information DTC indicates whether each detected part of the subject traffic signal SX is lighted or not. The traffic signal detection information DTC may indicate a color of each detected part of the subject traffic signal SX. The traffic signal detection information DTC may indicate a shape of each detected part of the subject traffic signal SX. The traffic signal detection information DTC may indicate a relative positional relationship between a plurality of detected parts of the subject traffic signal SX.

The traffic signal recognition system 10 can recognize a lighting state (signal indication) of the subject traffic signal SX based on the traffic signal detection information DTC. However, when only the traffic signal detection information DTC is used, accuracy of recognition of the lighting state is not necessarily high. The reason is that accuracy of the traffic signal detection information DTC itself is not necessarily high.

For example, when performance of the camera 2 is low, the accuracy of the traffic signal detection information DTC also becomes low. Moreover, the accuracy of the traffic signal detection information DTC depends not only on the performance of the camera 2 but also on performance of the image analysis. However, there is a limit on the performance of the image analysis. Completely identifying various shapes (e.g., circle, arrow, number) of lighting parts and various lighting patterns thereof requires an unrealistic number of learnings. That is, there is a limit on accuracy of recognition of the lighting state through the image analysis.

As described above, when only the traffic signal detection information DTC obtained from the camera image information IMG is used, the accuracy of recognition of the lighting state of the subject traffic signal SX is not necessarily high. In view of the above, according to the present embodiment, in order to improve the accuracy of recognition of the lighting state of the subject traffic signal SX, "lamp pattern information PAT" independent of the camera image information IMG is used in addition to the traffic signal detection information DTC.

1-2. Lamp Pattern Information

Figure 2:
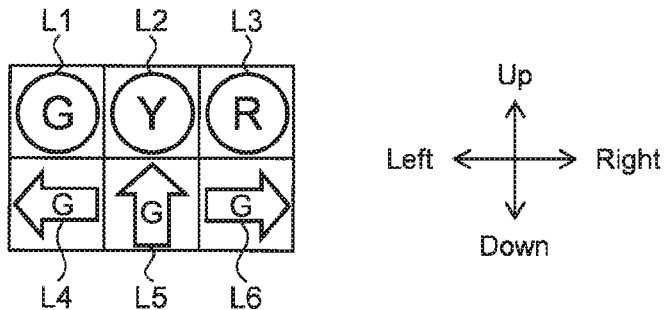
FIG. 2 is a conceptual diagram for explaining an example of lamp pattern information according to the embodiment of the present disclosure.

FIG. 2 is a conceptual diagram for explaining an example of the lamp pattern information PAT according to the present embodiment. In general, a traffic signal has a plurality of lamp parts. The lamp part is a part (portion) that is lighted and unlighted (i.e., turned on and off). The lamp part is exemplified by a light bulb, an LED (Light Emitting Diode), a luminescent device, a display, and the like. In the following description, the traffic signal has N lamp parts. Here, N is an integer equal to or larger than 2.

The lamp pattern information PAT indicates a pattern of the N lamp parts of the traffic signal. The pattern here includes a "relative positional relationship" between the N lamp parts, that is, a "configuration (arrangement)" of the N lamp parts. In addition, the pattern includes an "appearance" of each of the N lamp parts when lighted. The "appearance" of the lamp part when lighted includes at least a color (green, yellow, red, etc.) and a shape (circle, arrow, etc.).

The lamp pattern information PAT exemplified in FIG. 2 is one about a traffic signal having six lamp parts L1 to L6. The lamp parts L1 to L3 correspond to typical circular signals and are arranged horizontally in an upper stage. The lamp parts L4 to L6 correspond to arrow signals and are arranged horizontally in a lower stage. The lamp parts L1 to L3 are arranged in line from left to right in this order. The lamp parts L4 to L6 are arranged in line from left to right in this order. Accordingly, the lamp parts L1 and L4 are vertically adjacent to each other, the lamp parts L2 and L5 are vertically adjacent to each other, and the lamp parts L3 and L6 are vertically adjacent to each other.

The appearance of the lamp part L1 when lighted is a green circle. The appearance of the lamp part L2 when lighted is a yellow circle. The appearance of the lamp part L3 when lighted is a red circle. The appearance of the lamp part L4 when lighted is a green left arrow. The appearance of the lamp part L5 when lighted is a green up arrow. The appearance of the lamp part L6 when lighted is a green right arrow. It should be noted that capital letters "G", "Y", and "R" in FIG. 2 denote green, yellow, and red, respectively. The same applies to the following drawings.

The color of each lamp part when unlighted is black. This may be an implicit assumption or may be explicitly specified in the lamp pattern information PAT.

1-3. Lighting State Recognition Processing

The traffic signal recognition system 10 according to the present embodiment recognizes the lighting state of the subject traffic signal SX with high accuracy by comparing the traffic signal detection information DTC with the lamp pattern information PAT. This processing is hereinafter referred to as "lighting state recognition processing." Hereinafter, some examples of the lighting state recognition processing according to the present embodiment will be described.

1-3-1. First Example

Figure 3:
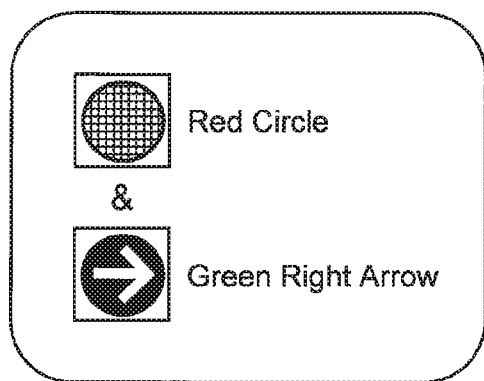
FIG. 3 is a conceptual diagram for explaining a first example of lighting state recognition processing according to the embodiment of the present disclosure.
Figure 3:
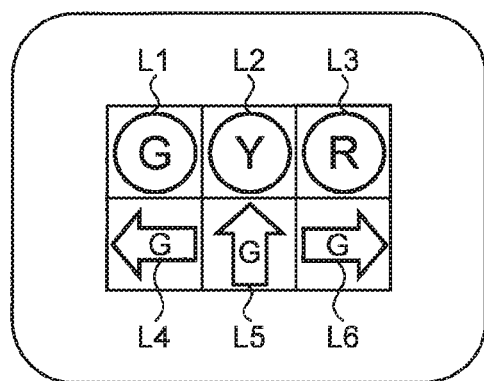
Figure 3:
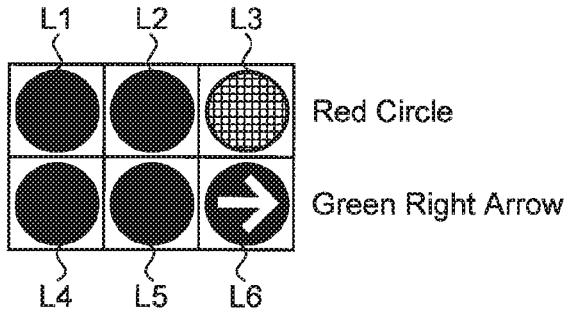

FIG. 3 is a conceptual diagram for explaining a first example of the lighting state recognition processing. The traffic signal detection information DTC includes information on two detected parts of the subject traffic signal SX. More specifically, the traffic signal detection information DTC indicates the "appearance" of each of the two detected parts of the subject traffic signal SX. In this example, the appearance of the detected part of the subject traffic signal SX includes both the color and the shape (i.e., a lighting shape of a lighting part). The appearance of one of the detected parts is a "red circle", and the appearance of the other of the detected parts is a "green right arrow." However, the relative positional relationship between the two detected parts is not known.

The traffic signal recognition system 10 compares the traffic signal detection information DTC with the lamp pattern information PAT. Then, the traffic signal recognition system 10 recognizes a lighting state of the lamp parts L1 to L6 that is consistent with (i.e., matches) the appearance of each of the two detected parts of the subject traffic signal SX as the lighting state of the subject traffic signal SX.

According to the lamp pattern information PAT, the appearance of the lamp part L3 when lighted is the "red circle", and the appearance of the lamp part L6 when lighted is the "green right arrow." Therefore, a lighting state "L3, L6: lighted; L1, L2, L4, L5: unlighted" is recognized as the lighting state of the subject traffic signal SX. That is, it is recognized that a "red circular signal" and a "green right arrow signal" lined vertically are lighted.

As described above, according to the first example, the traffic signal detection information DTC indicates the appearance of each of the plurality of detected parts of the subject traffic signal SX. Even when the relative positional relationship between the plurality of detected parts is unknown, it is possible to recognize the the lighting state of the subject traffic signal SX with high accuracy by referring to the lamp pattern information PAT.

1-3-2. Second Example

Figure 4:
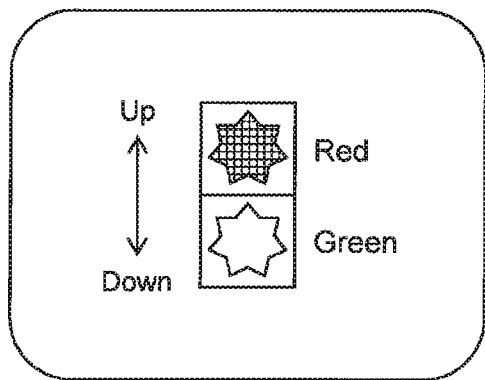
FIG. 4 is a conceptual diagram for explaining a second example of the lighting state recognition processing according to the embodiment of the present disclosure.
Figure 4:
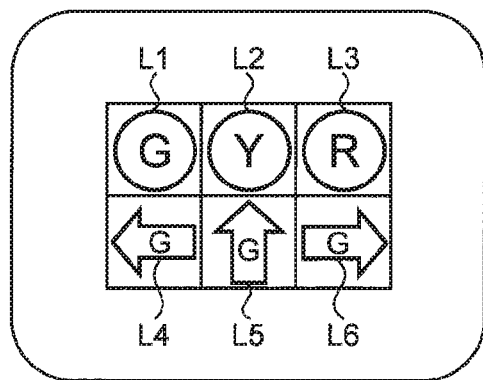
Figure 4:
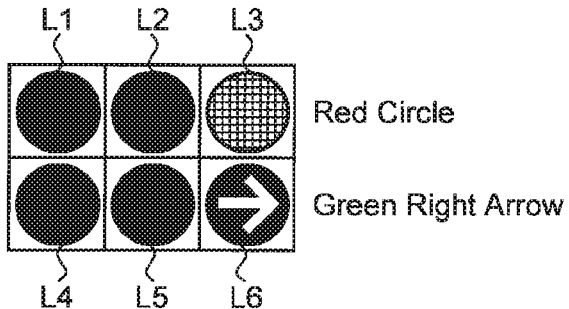

FIG. 4 is a conceptual diagram for explaining a second example of the lighting state recognition processing. The traffic signal detection information DTC includes information on two detected parts of the subject traffic signal SX. More specifically, the traffic signal detection information DTC indicates the "relative positional relationship" between the two detected parts in addition to the "appearance" of each of the two detected parts of the subject traffic signal SX. In this example, however, the appearance of the detected part includes only the color, and the shape (i.e., the lighting shape of the lighting part) is unknown. The appearance of one of the detected parts is "red", the appearance of the other of the detected parts is "green", and the two detected parts are vertically lined.

The traffic signal recognition system 10 compares the traffic signal detection information DTC with the lamp pattern information PAT. Then, the traffic signal recognition system 10 recognizes a lighting state of the lamp parts L1 to L6 that is consistent with (i.e., matches) both the appearance of each of the two detected parts of the subject traffic signal SX and the relative positional relationship between the two detected parts as the lighting state of the subject traffic signal SX.

According to the lamp pattern information PAT, the appearance of the lamp part L3 when lighted is "red", the appearance of the lamp part L6 when lighted is "green", and the two lamp parts L3 and L6 are vertically aligned. Therefore, a lighting state "L3, L6: lighted; L1, L2, L4, L5: unlighted" is recognized as the lighting state of the subject traffic signal SX. That is, it is recognized that a "red circular signal" and a "green right arrow signal" lined vertically are lighted.

As described above, according to the second example, the traffic signal detection information DTC indicates both the appearance (color) of each of the plurality of detected parts of the subject traffic signal SX and the relative positional relationship between the plurality of detected parts. Even when the exact shape of each detected part is unknown, it is possible to recognize the the lighting state of the subject traffic signal SX with high accuracy by referring to the lamp pattern information PAT.

1-3-3. Third Example

Figure 5:
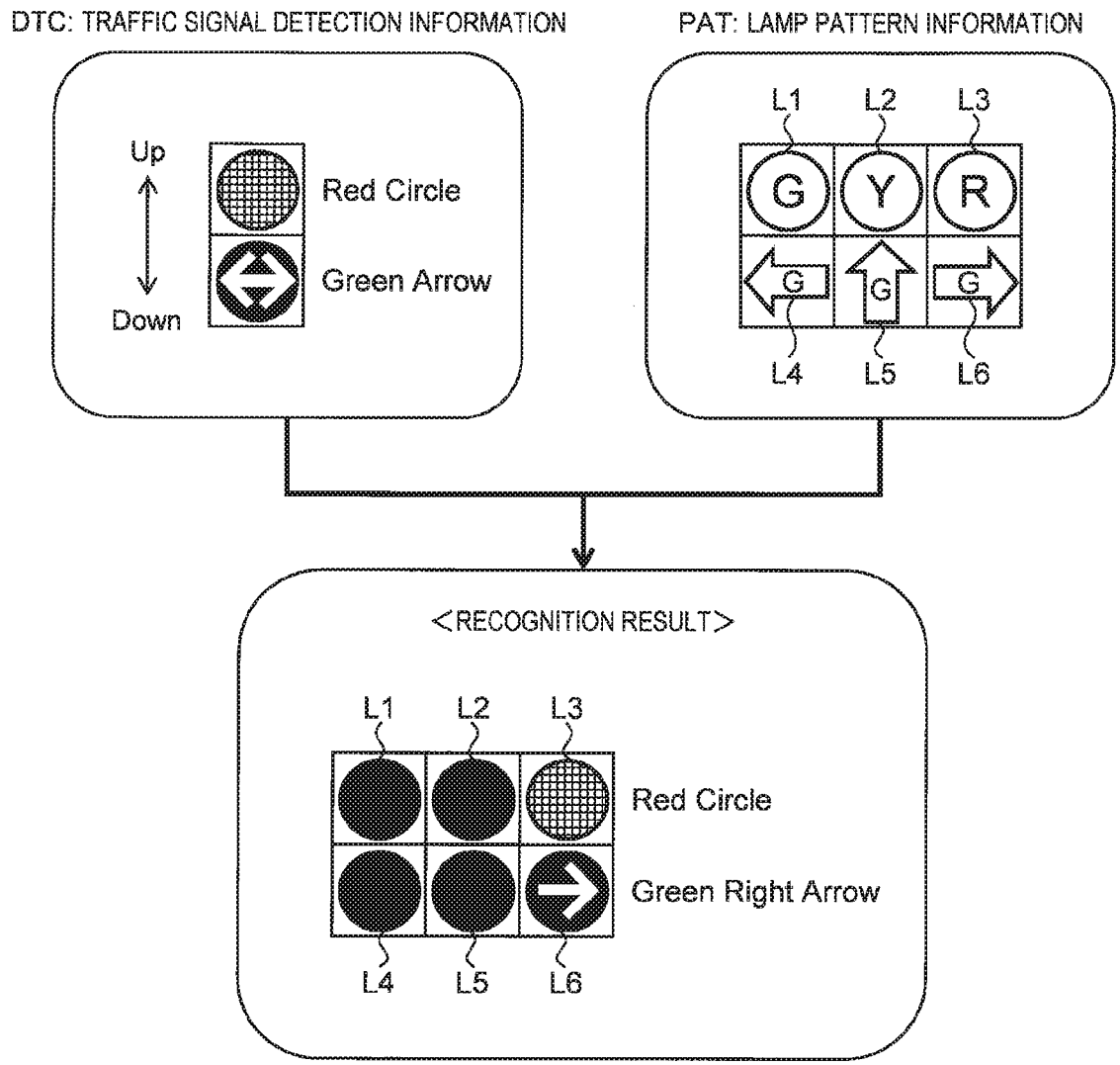
FIG. 5 is a conceptual diagram for explaining a third example of the lighting state recognition processing according to the embodiment of the present disclosure.

FIG. 5 is a conceptual diagram for explaining a third example of the lighting state recognition processing. The traffic signal detection information DTC indicates a rough shape of each of the two detected parts in addition to the contents in the case of the second example (FIG. 4) described above. The appearance of one of the detected parts is a "red circle", the appearance of the other of the detected parts is a "green arrow", and the two detected parts are vertically lined. However, a direction of the arrow is unknown.

As in the case of the second example, a lighting state "L3, L6: lighted; L1, L2, L4, L5: unlighted" is recognized as the lighting state of the subject traffic signal SX. That is, it is recognized that a "red circular signal" and a "green right arrow signal" lined vertically are lighted. Even when the arrow direction is unknown, it is possible to recognize the the lighting state of the subject traffic signal SX with high accuracy by referring to the lamp pattern information PAT.

1-3-4. Fourth Example

Figure 6:
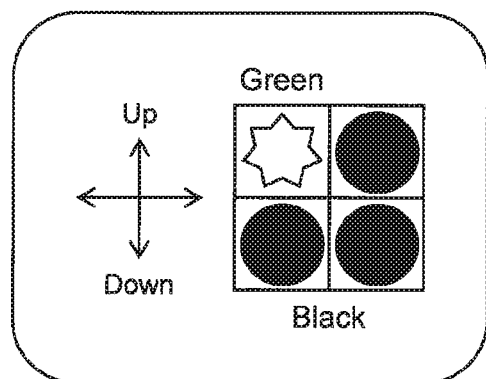
FIG. 6 is a conceptual diagram for explaining a fourth example of the lighting state recognition processing according to the embodiment of the present disclosure.
Figure 6:
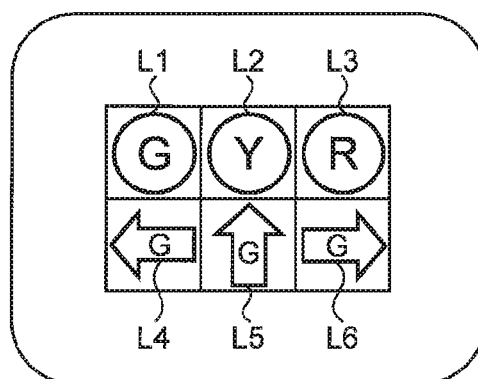
Figure 6:
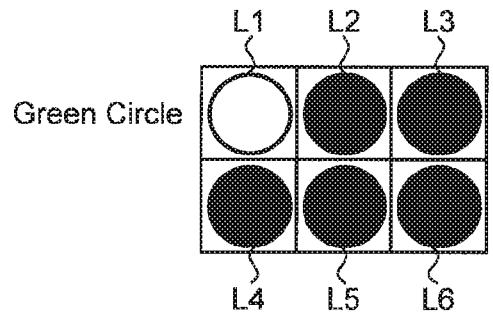

FIG. 6 is a conceptual diagram for explaining a fourth example of the lighting state recognition processing. The traffic signal detection information DTC may include not only information on a lighting part but also information on an unlighted part. That is, the plurality of detected parts of the subject traffic signal SX may include both the lighting part and the unlighted part. The color of the unlighted part is black.

In the example shown in FIG. 6, the traffic signal detection information DTC indicates not only the "appearance" of each of four detected parts of the subject traffic signal SX but also the "relative positional relationship" between the four detected parts. In this example, the appearance of the detected part includes only the color, and the shape (i.e., the lighting shape of the lighting part) is unknown. The appearance of one of the detected parts is "green", and the appearance of the other three detected parts each is "black". In addition, the three black detected parts are located on the right, on the lower side, and on the lower right of the green detected part, respectively.

According to the lamp pattern information PAT, there are four possible candidates for the green detected part: the lamp parts L1, L4 to L6. However, it is only the lamp part L1 that has other lamp parts on the right, on the lower side, and on the lower right. Therefore, a lighting state "L1: lighted; L2 to L6: unlighted" is recognized as the lighting state of the subject traffic signal SX. That is, it is recognized that only a "green circular signal" is lighted.

As described above, according to the fourth example, the black unlighted part also is utilized as the detected part. As a result, even when there is only one lighting part of the subject traffic signal SX, it is possible to recognize the the lighting state of the subject traffic signal SX with high accuracy by referring to the lamp pattern information PAT.

1-3-5. Fifth Example

Figure 7:
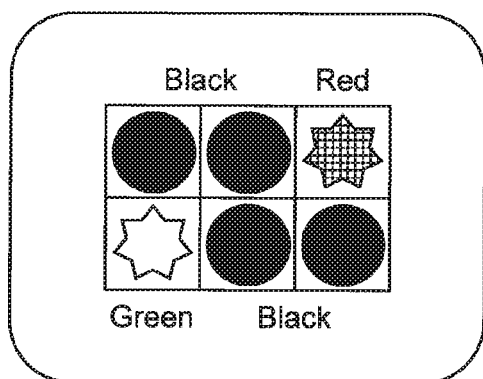
FIG. 7 is a conceptual diagram for explaining a fifth example of the lighting state recognition processing according to the embodiment of the present disclosure.
Figure 7:
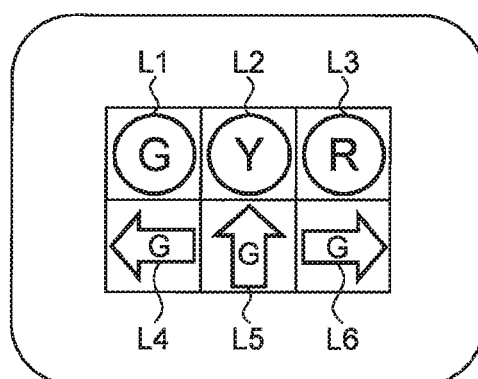
Figure 7:
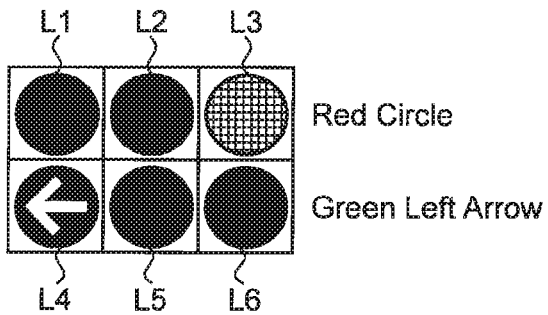

FIG. 7 is a conceptual diagram for explaining a fifth example of the lighting state recognition processing. As in the case of the fourth example (FIG. 6) described above, the plurality of detected parts of the subject traffic signal SX include both the lighting part and the unlighted part.

The traffic signal detection information DTC indicates not only the "appearance" of each of six detected parts of the subject traffic signal SX but also the "relative positional relationship" between the six detected parts. In this example, the appearance of the detected part includes only the color, and the shape (i.e., the shape of the lighting part when lighted) is unknown. That is, a red detected part is located on the upper right, and three black detected parts are located on the left, on the lower side, and on the lower left of the red detected part, respectively. Moreover, a green detected part is located on the lower left, and three black detected parts are located on the right, on the upper side, and on the upper right of the green detected part.

According to the lamp pattern information PAT, there are four possible candidates for the green detected part: the lamp parts L1, L4 to L6. However, it is only the lamp part L4 that has other lamp parts on the right, on the upper side, and on the upper right. Therefore, a lighting state "L3, L4: lighted; L1, L2, L5, L6: unlighted" is recognized as the lighting state of the subject traffic signal SX. That is, it is recognized that a "red circular signal" and a "green left arrow signal" are lighted.

As described above, according to the fifth example, the black unlighted part also is utilized as the detected part. As a result, even when the exact shape of each detected part of the subject traffic signal SX is unknown, it is possible to recognize the the lighting state of the subject traffic signal SX with high accuracy by referring to the lamp pattern information PAT.

1-3-6. Sixth Example

Figure 8:
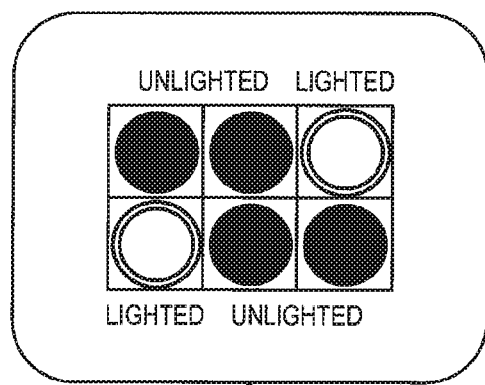
FIG. 8 is a conceptual diagram for explaining a sixth example of the lighting state recognition processing according to the embodiment of the present disclosure.
Figure 8:
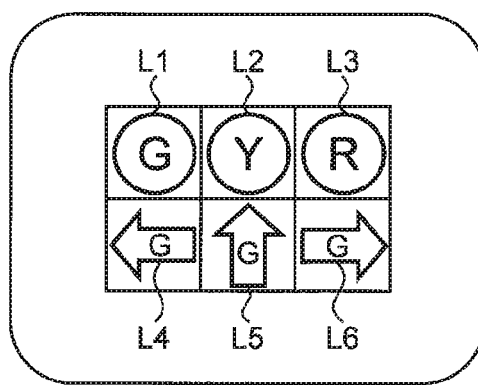
Figure 8:
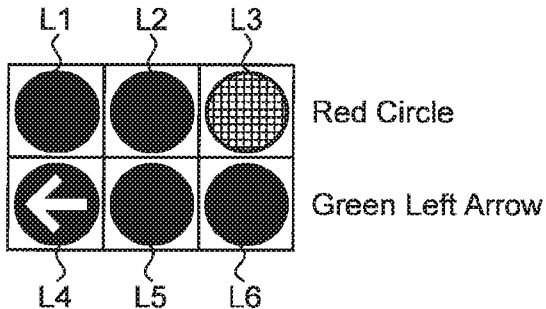

FIG. 8 is a conceptual diagram for explaining a sixth example of the lighting state recognition processing. The traffic signal detection information DTC indicates not only the "appearance" of each of six detected parts of the subject traffic signal SX but also the "relative positional relationship" between the six detected parts. In this example, the appearance of the detected part includes whether lighted or not, but the color and the shape are unknown. That is, whether each detected part of the subject traffic signal SX is lighted or not is known, but the color and the shape of each detected part is unknown.

In the example shown in FIG. 8, an upper right detected part and a lower left detected part among the six detected parts are lighted. Unlighted parts exist between the two lighting parts on the upper right and on the lower left. Referring to the lamp pattern information PAT, it can be seen that the two lighting parts correspond to the lamp parts L3 and L4. Therefore, a lighting state "L3, L4: lighted; L1, L2, L5, L6: unlighted" is recognized as the lighting state of the subject traffic signal SX. That is, it is recognized that a "red circular signal" and a "green left arrow signal" are lighted.

As described above, according to the sixth example, the traffic signal detection information DTC indicates the relative positional relationship between the plurality of detected parts of the subject traffic signal SX and whether each detected part is lighted or not. Even when the color and the shape of each detected part is unknown, it is possible to recognize the the lighting state of the subject traffic signal SX with high accuracy by referring to the lamp pattern information PAT.

1-3-7. Seventh Example

Figure 9:
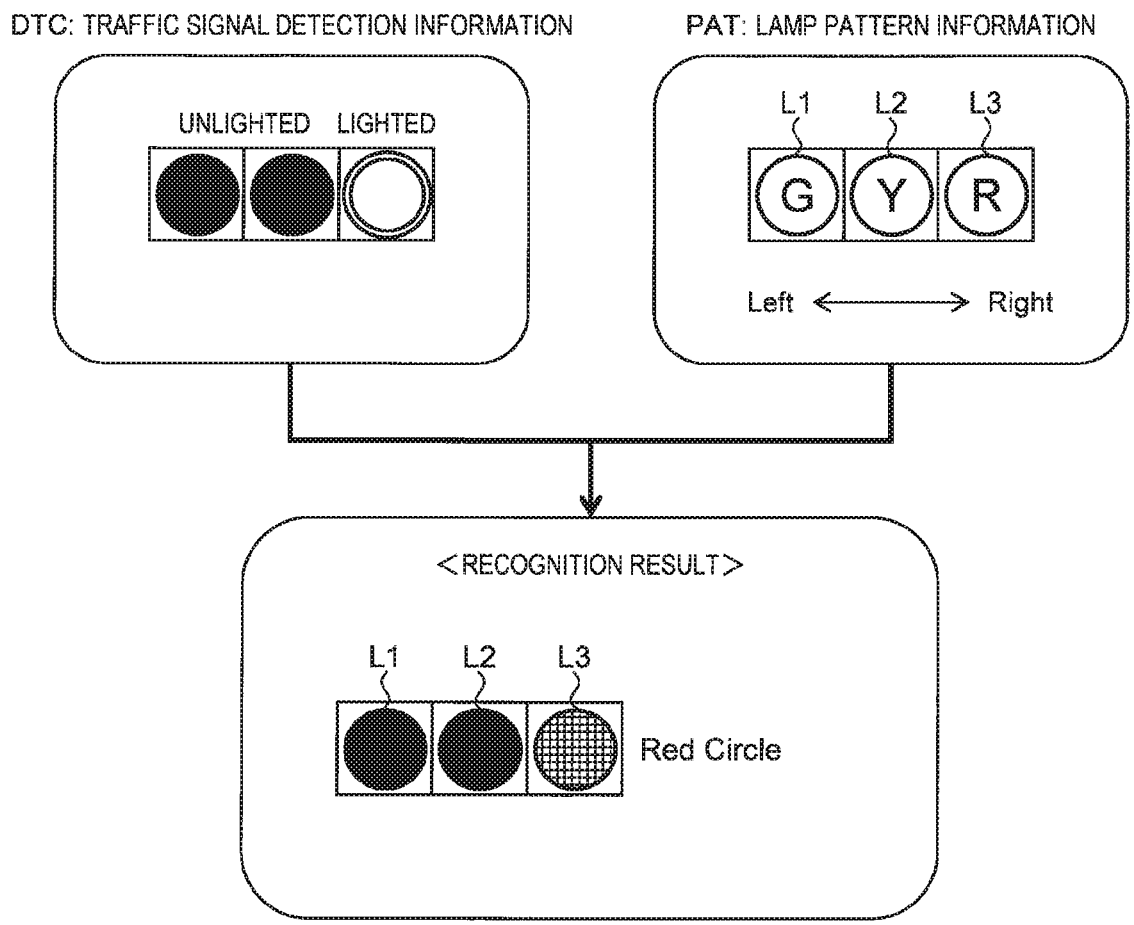
FIG. 9 is a conceptual diagram for explaining a seventh example of the lighting state recognition processing according to the embodiment of the present disclosure.

FIG. 9 is a conceptual diagram for explaining a seventh example of the lighting state recognition processing. In this example, the traffic signal has only three lamp parts L1 to L3 arranged horizontally.

The traffic signal detection information DTC indicates the relative positional relationship between three detected parts of the subject traffic signal SX and whether each detected part is lighted or not. More specifically, a rightmost detected part among the three detected parts is lighted, and a leftmost detected part and a central detected part is unlighted. Referring to the lamp pattern information PAT, it can be seen that the rightmost lighting part corresponds to the lamp part L3. Therefore, a lighting state "L3: lighted; L1, L2: unlighted" is recognized as the lighting state of the subject traffic signal SX. That is, it is recognized that a "red circular signal" is lighted.

As described above, the traffic signal detection information DTC indicates at least the "appearance" of each of the plurality of detected parts of the subject traffic signal SX. For example, the appearance of each detected part includes the "color" of each detected part. The appearance of each detected part may further include the "shape when lighted" of each detected part. The traffic signal detection information DTC may further indicate the "relative positional relationship" between the plurality of detected parts of the subject traffic signal SX. When the relative positional relationship is known, the accuracy of recognition of the lighting state of the subject traffic signal SX is further increased. When the relative positional relationship is known, the appearance of each detected part may include "whether each detected part is lighted or not." The more detailed the appearance of the detected part is, the higher the accuracy of recognition of the lighting state of the subject traffic signal SX is.

1-4. Variety of Lamp Pattern Information

There are various types of traffic signals on the road. Moreover, the type of traffic signal may vary from country to country. Therefore, the lamp pattern information PAT may be prepared in advance for each type of traffic signal.

Figure 10:
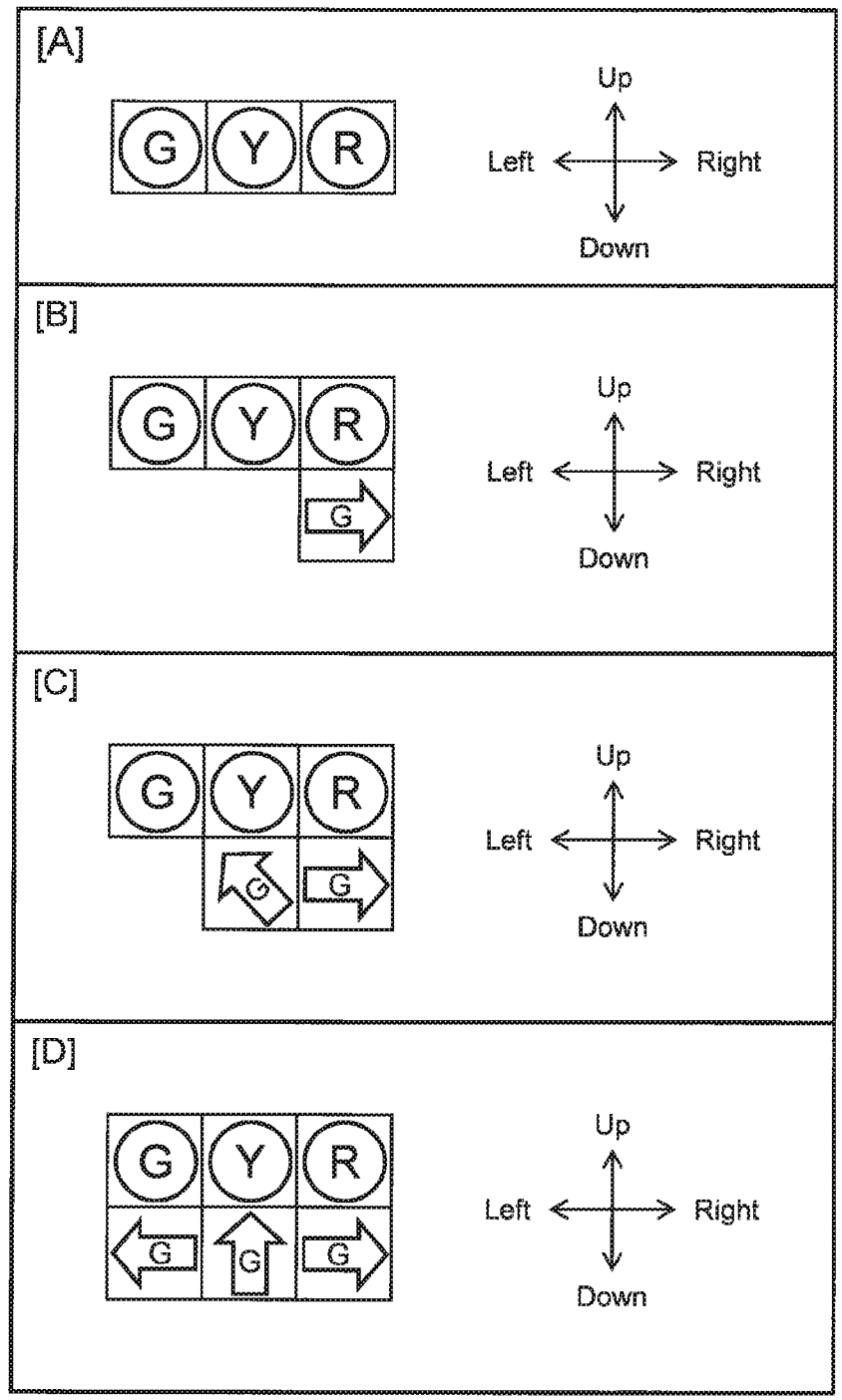
FIG. 10 is a conceptual diagram showing various examples of the lamp pattern information according to the embodiment of the present disclosure.

FIG. 10 shows various examples of the lamp pattern information PAT. An example [A] in FIG. 10 is the same as that shown in FIG. 9. An example [D] is the same as that shown in FIG. 2. An example [B] has only a right arrow signal as an arrow signal. An example [C] has a northwest arrow signal. In the lamp pattern information PAT, the northwest arrow may be defined as "up arrow or left arrow."

Figure 11:
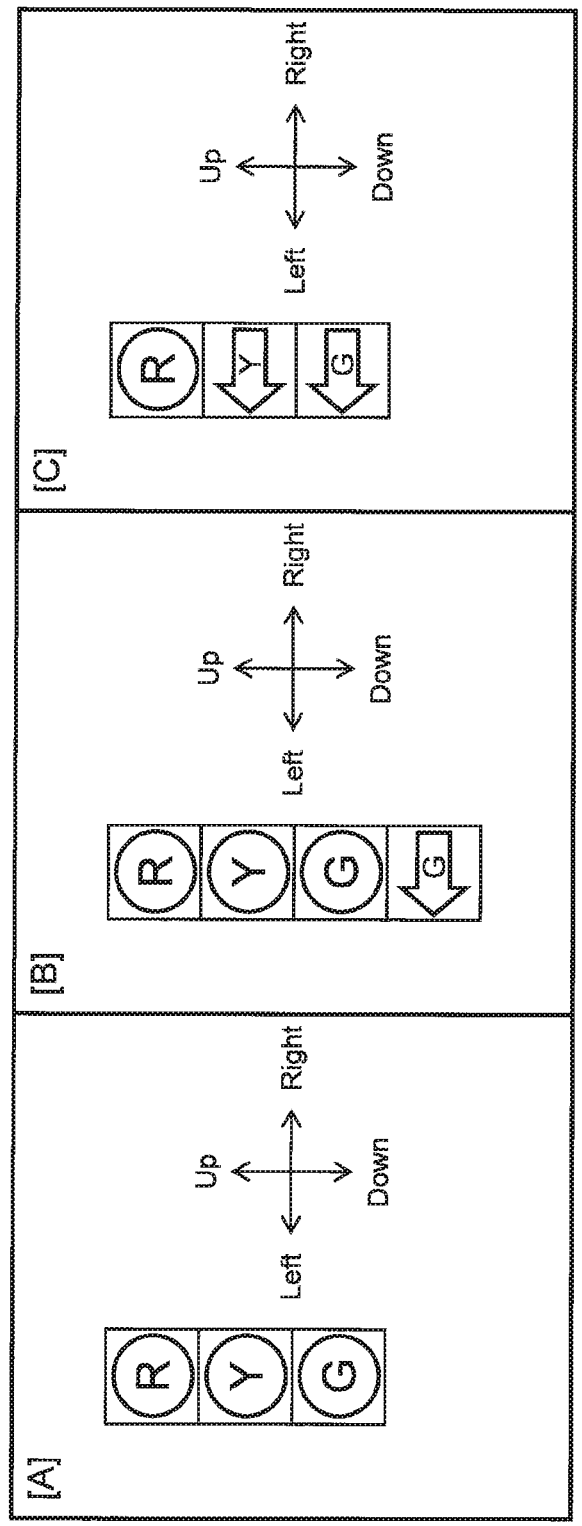
FIG. 11 is a conceptual diagram showing still other examples of the lamp pattern information according to the embodiment of the present disclosure.

FIG. 11 shows still other examples of the lamp pattern information PAT. In the examples shown in FIG. 11, red, yellow, and green circular signals are vertically arranged. An example [B] further has an arrow signal. An example [C] has a yellow arrow signal and a green arrow signal.

Figure 12:
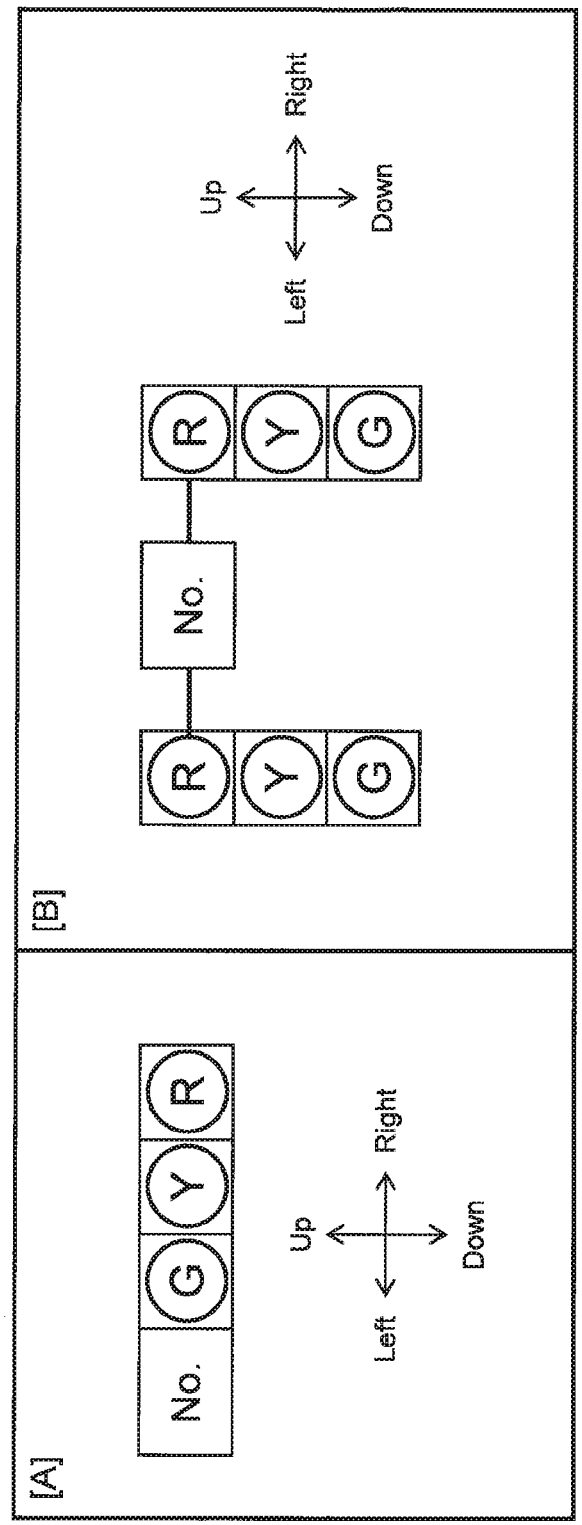
FIG. 12 is a conceptual diagram showing still other examples of the lamp pattern information according to the embodiment of the present disclosure.

FIG. 12 shows still other examples of the lamp pattern information PAT. In the examples shown in FIG. 12, the traffic signal has a lamp part indicating a "number." In an example [A] in FIG. 12, a lamp part indicating a number is located on the left of a lamp part indicating a green signal, and the number means a remaining time of the green signal indication. In an example [B], a lamp part indicating a number representing a remaining time of red signal indication is arranged.

Figure 13:
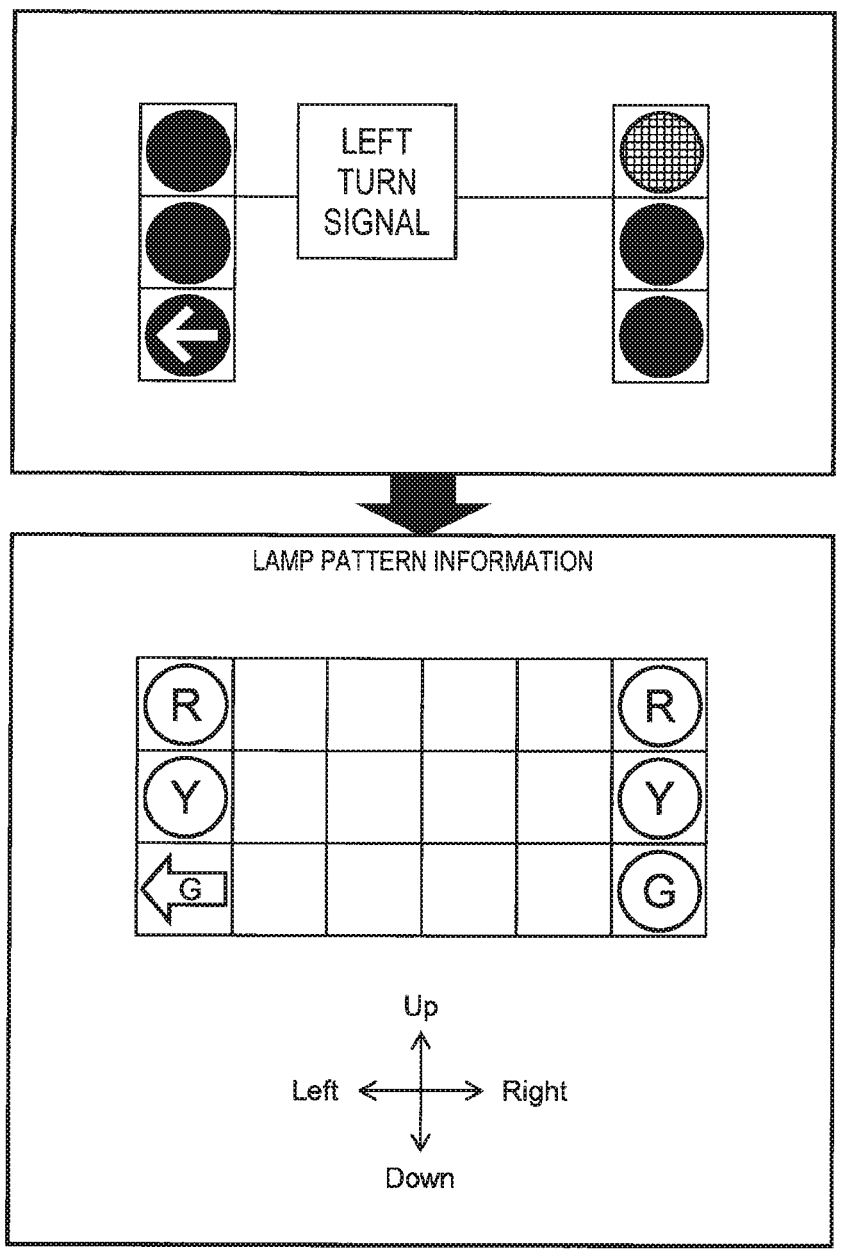
FIG. 13 is a conceptual diagram showing still another example of the lamp pattern information according to the embodiment of the present disclosure.

FIG. 13 shows still another example of the lamp pattern information PAT. In the example shown in FIG. 13, a single traffic signal consists of two partial traffic signals that are separated from each other. The partial traffic signal on the right side is a traffic signal for going forward at an intersection. The partial traffic signal on the left side is a traffic signal for a left turn at the same intersection.

Figure 14:
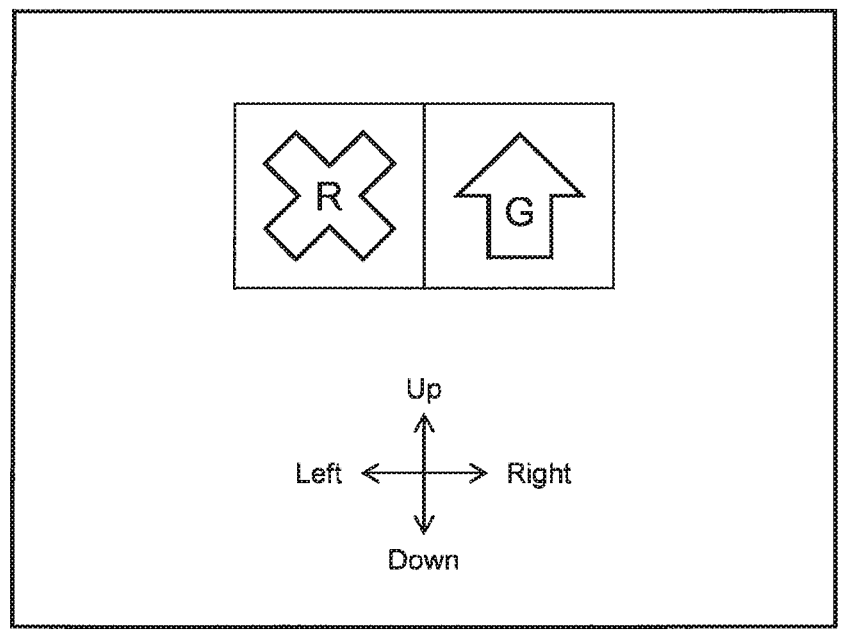
FIG. 14 is a conceptual diagram showing still another example of the lamp pattern information according to the embodiment of the present disclosure.

FIG. 14 is a conceptual diagram showing still another example of the lamp pattern information PAT. In the example shown in FIG. 14, a "red X-shaped" lamp part and a "green up arrow" lamp part are arranged adjacent to each other. For example, the "red X-shaped" means entry prohibited and the "green up arrow" means entry permitted.

When there are plural types of the lamp pattern information PAT, an appropriate lamp pattern information PAT associated with the subject traffic signal SX is selected. It is also possible to execute the lighting state recognition processing by using each of the plural types of the lamp pattern information PAT and then adopt a recognition result with the highest consistency. Details of selection and usage of the lamp pattern information PAT will be described later.

1-5. Summary And Effects

According to the present embodiment, as described above, the traffic signal recognition system 10 detects the subject traffic signal SX around the the vehicle 1 based on the camera image information IMG to acquire the traffic signal detection information DTC. The traffic signal detection information DTC indicates at least the appearance of each of the plurality of detected parts of the subject traffic signal SX.

For recognizing the lighting state of the subject traffic signal SX, the traffic signal recognition system 10 uses not only the traffic signal detection information DTC that is based on the camera image information IMG but also the lamp pattern information PAT that is independent of the camera image information IMG. The lamp pattern information PAT indicates the relative positional relationship between the N lamp parts of the traffic signal and the appearance of each of the N lamp parts when lighted. The traffic signal recognition system 10 compares the traffic signal detection information DTC with the lamp pattern information PAT. Then, the traffic signal recognition system 10 recognizes a lighting state of the N lamp parts that is consistent with the appearance of each of the plurality of detected parts of the subject traffic signal SX as the lighting state of the subject traffic signal SX.

As described above, the lighting state of the subject traffic signal SX is recognized through the comparison between the traffic signal detection information DTC that is based on the camera image information IMG and the lamp pattern information PAT that is independent of the camera image information IMG, and thus the accuracy of recognition is improved. Moreover, in the comparison, an attention is paid not to a single detected part but to the plurality of detected parts of the subject traffic signal SX, which also contributes to improvement in the accuracy of recognition.

The traffic signal detection information DTC may indicate not only the appearance of each of the plurality of detected parts of the subject traffic signal SX but also the relative positional relationship between the plurality of detected parts. In this case, the traffic signal recognition system 10 recognizes a lighting state of the N lamp parts that is consistent with both the appearance of each of the plurality of detected parts of the subject traffic signal SX and the relative positional relationship between the plurality of detected parts as the lighting state of the subject traffic signal SX. As a result, the accuracy of recognition is further improved.

Hereinafter, the traffic signal recognition system 10 according to the present embodiment will be described in more details.

2. Functional Configuration Example of Traffic Signal Recognition System

2-1. Traffic Signal Map Information

FIG. 15 is a conceptual diagram for explaining an example of traffic signal map information SG_MAP in the present embodiment. The traffic signal map information SG_MAP is map information regarding the traffic signal. More specifically, the traffic signal map information SG_MAP indicates a position [X, Y, Z] and an orientation H for each traffic signal (SG1, SG2, SG3 . . . ). Here, the position [X, Y, Z] is an absolute position and defined in an absolute coordinate system (latitude, longitude, altitude). The orientation H also is defined in the absolute coordinate system. Such the traffic signal map information SG_MAP is created in advance.

2-2. Lamp Pattern Database

FIG. 16 is a conceptual diagram for explaining an example of a lamp pattern database PAT_DB in the present embodiment. The lamp pattern database PAT_DB indicates the lamp pattern information PAT (PAT1, PAT2, PAT3 . . . ) to be used for each traffic signal (SG1, SG2, SG3 . . . ). More specifically, the lamp pattern database PAT_DB indicates the position [X, Y, Z] of the traffic signal (SG1, SG2, SG3 . . . ) and the lamp pattern information PAT (PAT1, PAT2, PAT3 . . . ) which are associated with each other. The position [X, Y, Z] and the orientation H of the traffic signal may be associated with the lamp pattern information PAT. Such the lamp pattern database PAT_DB is created in advance.

The traffic signal map information SG_MAP and the lamp pattern database PAT_DB may be integrated. That is, the traffic signal map information SG_MAP may indicate the position [X, Y, Z], the orientation H, and the lamp pattern information PAT (PAT1, PAT2, PAT3 . . . ) to be used for each traffic signal (SG1, SG2, SG3 . . . ).

2-3. Functional Configuration and Process Flow

Figure 17:
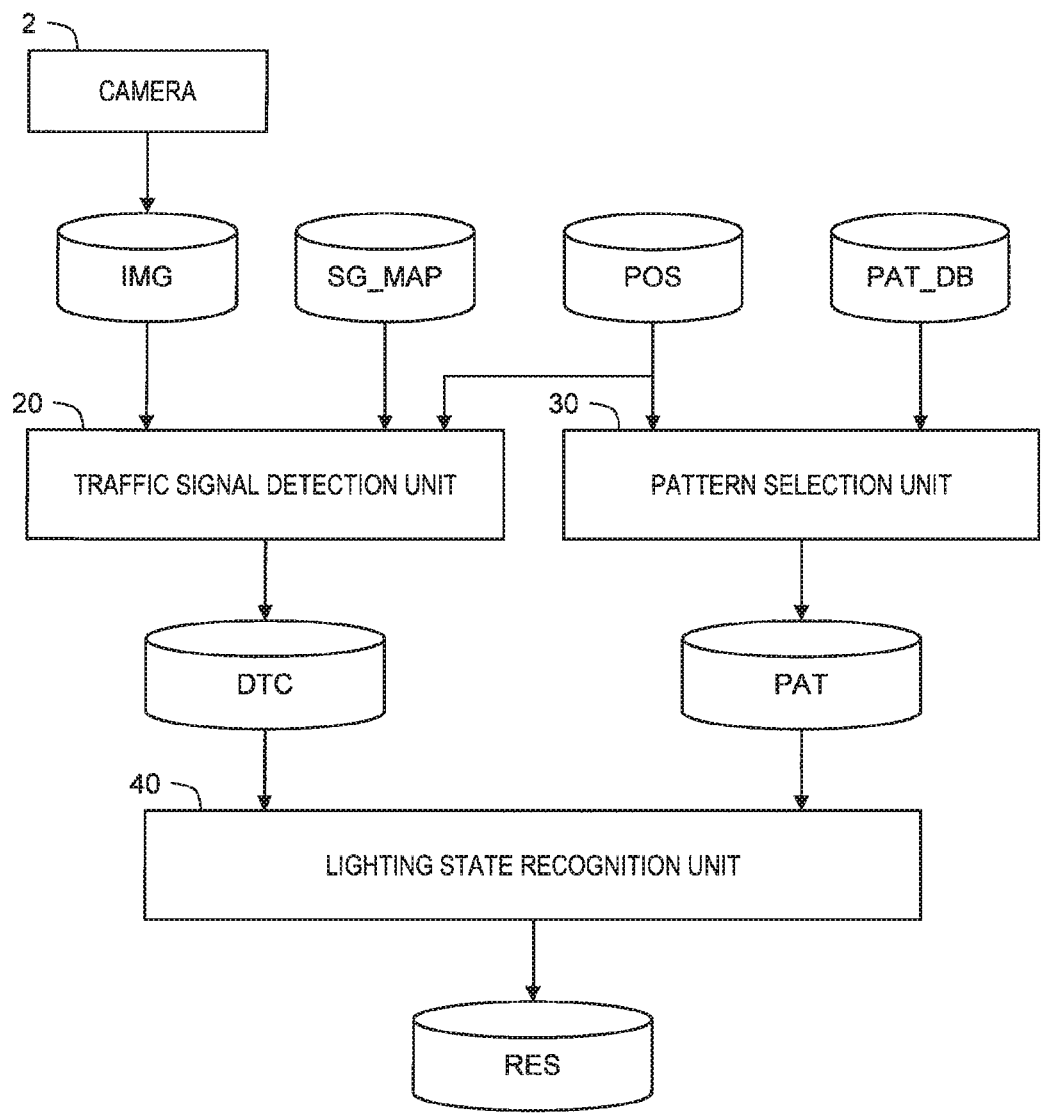
FIG. 17 is a block diagram showing a functional configuration example of a traffic signal recognition system according to the embodiment of the present disclosure.
Figure 18:
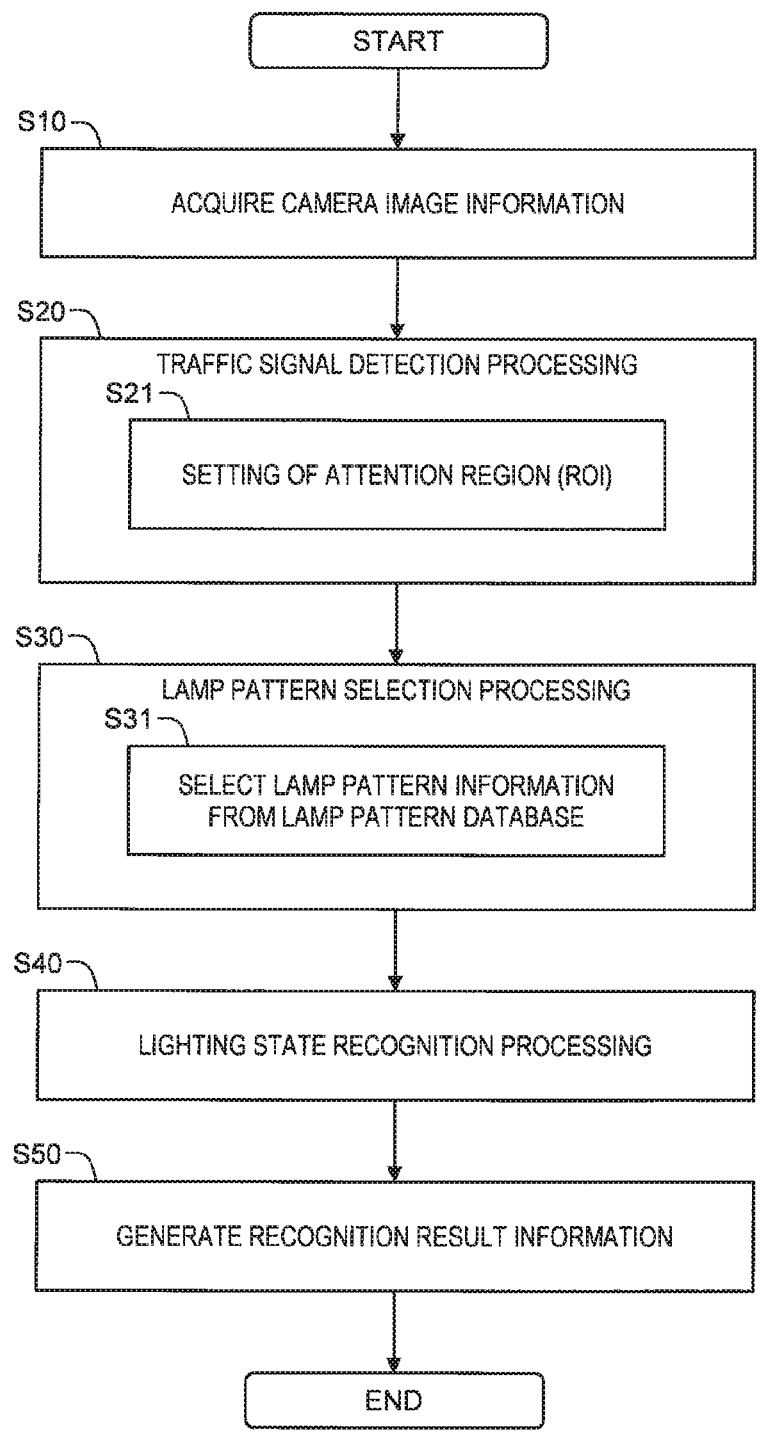
FIG. 18 is a flow chart showing processing by the traffic signal recognition system according to the embodiment of the present disclosure.

FIG. 17 is a block diagram showing a functional configuration example of the traffic signal recognition system 10 according to the present embodiment. The traffic signal recognition system 10 includes a traffic signal detection unit 20, a pattern selection unit 30, and a lighting state recognition unit 40. FIG. 18 is a flow chart showing processing by the traffic signal recognition system 10 according to the present embodiment. The processing by the traffic signal recognition system 10 according to the present embodiment will be described with reference to FIGS. 17 and 18.

2-3-1. Step S10

The camera 2 installed on the vehicle 1 captures a situation around the vehicle 1. The camera image information IMG includes an image imaged by the camera 2, that is, an image indicating the situation around the vehicle 1. The traffic signal detection unit 20 acquires the camera image information IMG.

2-3-2. Step S20

The traffic signal detection unit 20 executes "traffic signal detection processing" that detects a traffic signal around the vehicle 1 based on the camera image information IMG.

Figure 19:
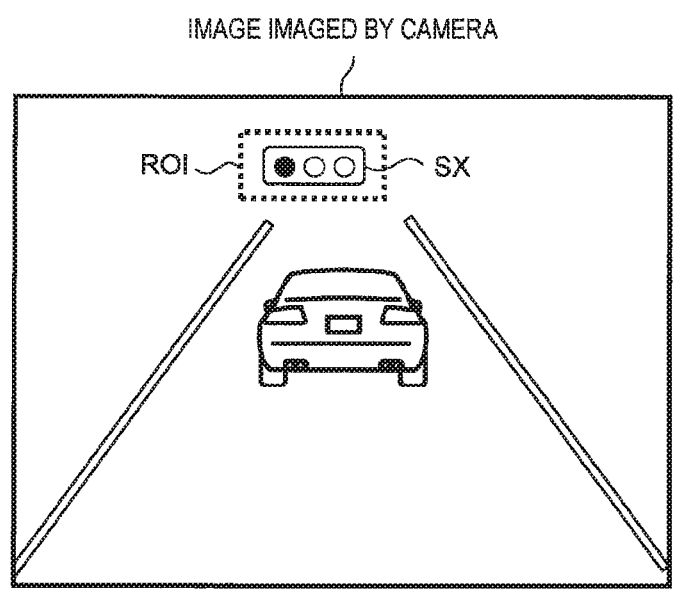
FIG. 19 is a conceptual diagram for explaining traffic signal detection processing according to the embodiment of the present disclosure.

First, the traffic signal detection unit 20 sets an "attention region (region of interest) ROI" in the image indicated by the camera image information IMG (Step S21). As shown in FIG. 19, the attention region ROI is a partial region of the image in which a traffic signal is expected to be present. In order to set the attention region ROI, position information POS and the above-described traffic signal map information SG_MAP (see FIG. 15) are used.

The position information POS indicates a position and an orientation of the vehicle 1 or the camera 2 in the absolute coordinate system. An installation position and an installation orientation of the camera 2 in a vehicle coordinate system fixed to the vehicle 1 are known. Therefore, the position and the orientation of the camera 2 in the absolute coordinate system can be calculated from the position and the orientation of the vehicle 1 in the absolute coordinate system.

Based on the position and the orientation of the camera 2, it is possible to extract a traffic signal expected to be imaged by the camera 2 from the traffic signal map information SG_MAP. That is, the traffic signal detection unit 20 identifies a traffic signal expected to be imaged by the camera 2 based on the position information POS and the traffic signal map information SG_MAP. Then, based on a relative positional relationship between the camera 2 and the identified traffic signal, the traffic signal detection unit 20 sets an image region in which the identified traffic signal exists as the attention region ROI. In some cases, there are a plurality of attention regions ROI in a single image.

After setting the attention region ROI, the traffic signal detection unit 20 detects a traffic signal from the attention region ROI. An image analysis method for detecting (extracting) a traffic signal from an image is well known (see Patent Literature 1 for example). Setting the attention region ROI in advance makes it possible to greatly reduce a computation amount of the traffic signal detection processing.

The traffic signal detected by the traffic signal detection processing is the "subject traffic signal SX" whose lighting state is to be recognized. The traffic signal detection unit 20 acquires the traffic signal detection information DTC indicating a result of detection of the subject traffic signal SX.

As described in FIGS. 3 to 9, the traffic signal detection information DTC indicates at least the appearance of each of the plurality of detected parts of the subject traffic signal SX. For example, the appearance of each detected part includes the "color" of each detected part. The appearance of each detected part may further include the "shape when lighted" of each detected part. The traffic signal detection information DTC may further indicate the "relative positional relationship" between the plurality of detected parts of the subject traffic signal SX. When the relative positional relationship is known, the appearance of each detected part may include "whether each detected part is lighted or not."

2-3-3. Step S30

The pattern selection unit 30 executes "lamp pattern selection processing" that selects the lamp pattern information PAT to be used. In the present embodiment, the pattern selection unit 30 selects the lamp pattern information PAT to be used from the lamp pattern database PAT_DB (see FIG. 16) (Step S31).

More specifically, the lamp pattern database PAT_DB and the position information POS described above are used. Based on the position and the orientation of the camera 2, the pattern selection unit 30 identifies a traffic signal expected to be imaged by the camera 2 from the lamp pattern database PAT_DB. The identified traffic signal corresponds to the subject traffic signal SX. Then, the pattern selection unit 30 acquires (selects) the lamp pattern information PAT associated with the position of the identified traffic signal (i.e., the subject traffic signal SX) from the lamp pattern database.

2-3-4. Step S40

The lighting state recognition unit 40 executes the "lighting state recognition processing" that recognizes the lighting state of the subject traffic signal SX. More specifically, the lighting state recognition unit 40 recognizes the lighting state of the subject traffic signal SX by comparing the traffic signal detection information DTC with the lamp pattern information PAT (see FIGS. 3 to 9).

The traffic signal detection information DTC indicates at least the appearance of each of the plurality of detected parts of the subject traffic signal SX. The lamp pattern information PAT indicates the relative positional relationship between the N lamp parts of the traffic signal and the appearance of each of the N lamp parts when lighted. The lighting state recognition unit 40 recognizes a lighting state of the N lamp parts that is consistent with the appearance of each of the plurality of detected parts of the subject traffic signal SX as the lighting state of the subject traffic signal SX.

The traffic signal detection information DTC may indicate not only the appearance of each of the plurality of detected parts of the subject traffic signal SX but also the relative positional relationship between the plurality of detected parts. In this case, the lighting state recognition unit 40 recognizes a lighting state of the N lamp parts that is consistent with both the appearance of each of the plurality of detected parts of the subject traffic signal SX and the relative positional relationship between the plurality of detected parts as the lighting state of the subject traffic signal SX.

2-3-5. Step S50

The lighting state recognition unit 40 generates recognition result information RES indicating the result of the lighting state recognition processing. The recognition result information RES is utilized for automated driving control of the vehicle, and so forth.

3. Concrete Configuration Example of Traffic Signal Recognition System

Hereinafter, a concrete configuration example of the traffic signal recognition system 10 according to the present embodiment will be described.

3-1. First Configuration Example

Figure 20:
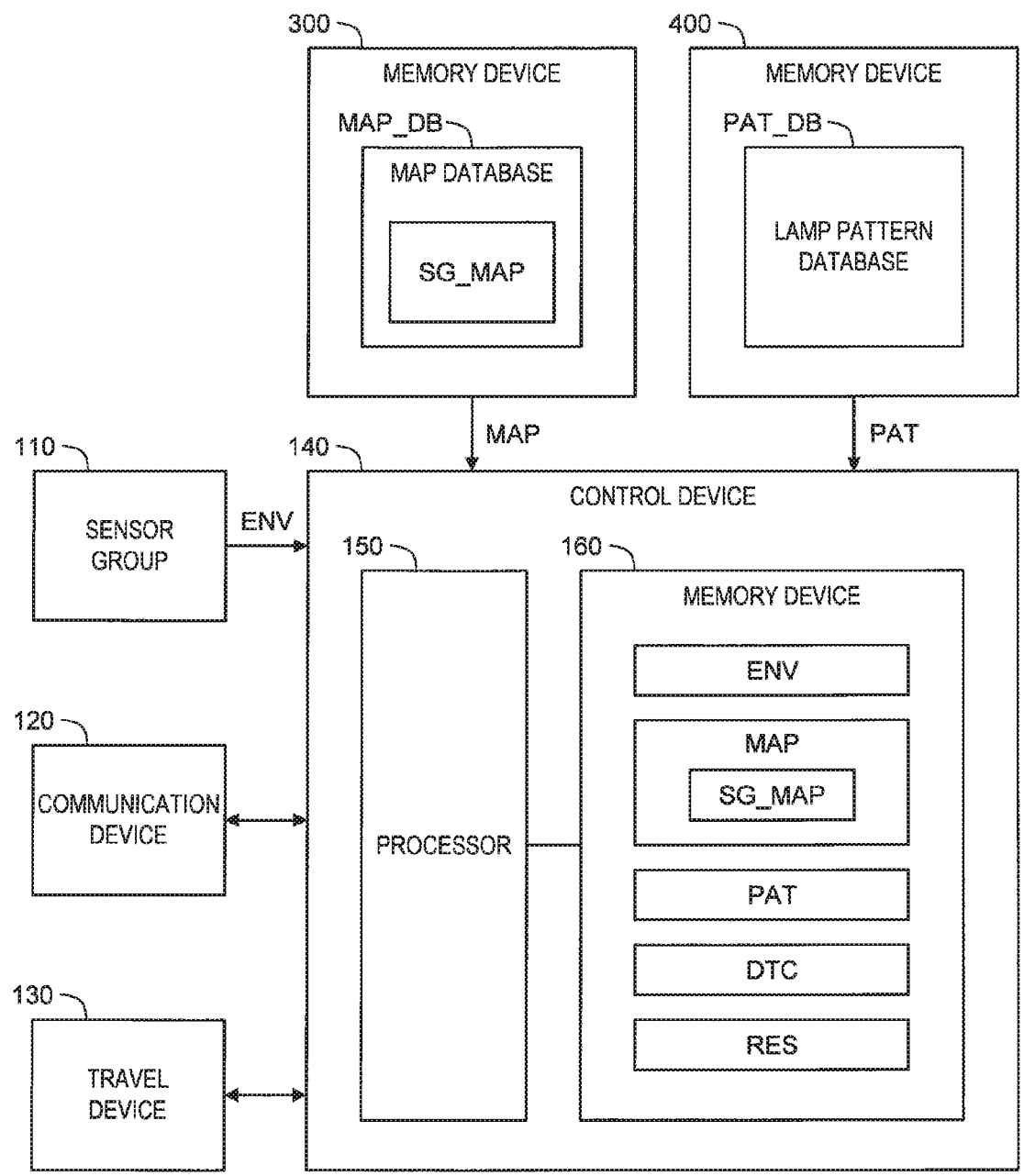
FIG. 20 is a block diagram showing a first configuration example of the traffic signal recognition system according to the embodiment of the present disclosure.

FIG. 20 is a block diagram showing a first configuration example of the traffic signal recognition system 10 according to the present embodiment. In the first configuration example, the traffic signal recognition system 10 is realized by an in-vehicle device 100 installed on the vehicle 1.

The in-vehicle device 100 includes a sensor group 110, a communication device 120, a travel device 130, and a control device (controller) 140.

The sensor group 110 acquires driving environment information ENV indicating a driving environment for the vehicle 1.

Figure 21:
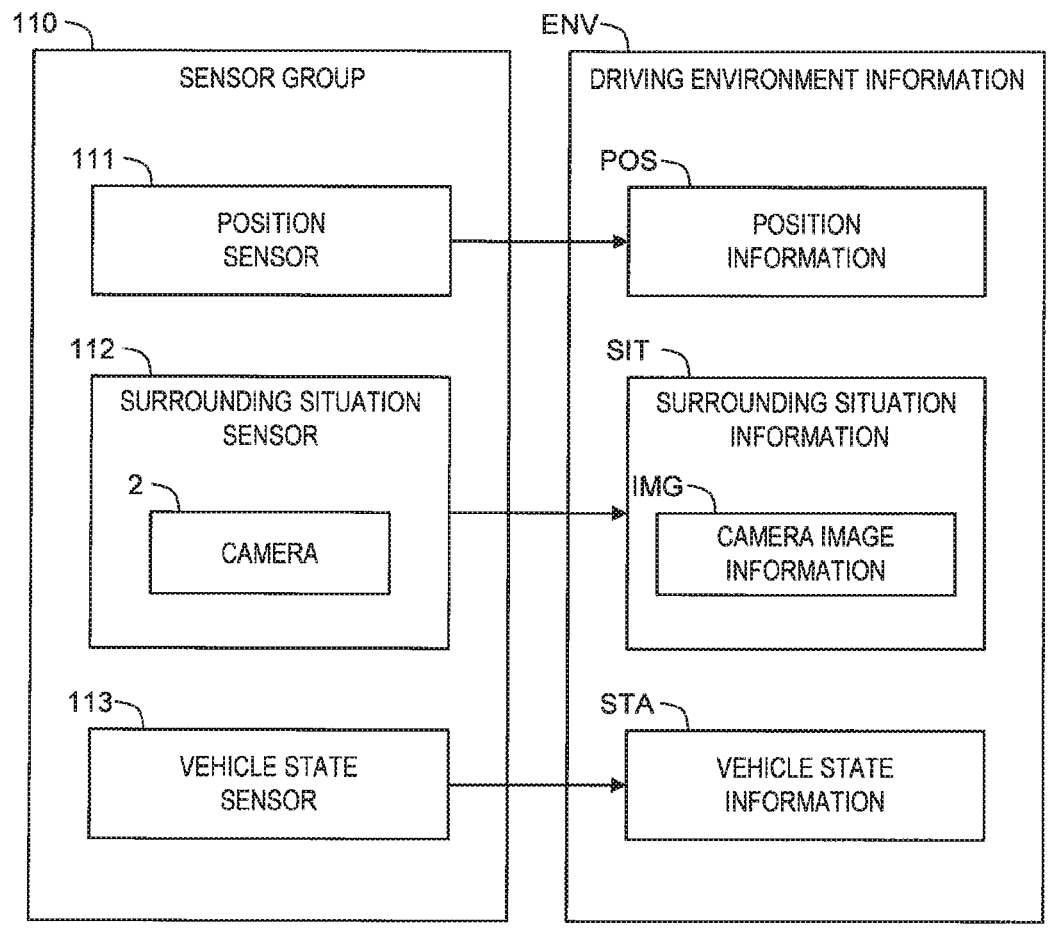
FIG. 21 is a block diagram showing an example of a sensor group and driving environment information according to the embodiment of the present disclosure.

FIG. 21 is a block diagram showing an example of the sensor group 110 and the driving environment information ENV. The sensor group 110 includes a position sensor 111, a surrounding situation sensor 112, and a vehicle state sensor 113. The driving environment information ENV includes the position information POS, surrounding situation information SIT, and vehicle state information STA.

The position sensor 111 detects a position and an orientation of the vehicle 1. For example, the position sensor 111 includes a GPS (Global Positioning System) sensor that detects the position and the orientation of the vehicle 1. The position information POS indicates the position and the orientation of the vehicle 1 or the camera 2 in the absolute coordinate system. The installation position and the installation orientation of the camera 2 in the vehicle coordinate system fixed to the vehicle 1 are known. Therefore, the position and the orientation of the camera 2 in the absolute coordinate system can be calculated from the position and the orientation of the vehicle 1 in the absolute coordinate system.

The surrounding situation sensor 112 detects a situation around the vehicle 1. The surrounding situation sensor 112 includes the camera 2. The camera 2 images a situation around the vehicle 1. Typically, the camera 2 is placed so as to image a situation ahead of the vehicle 1. The surrounding situation sensor 112 may further include a LIDAR (Laser Imaging Detection and Ranging) and/or a radar. The surrounding situation information SIT is information obtained from a result of detection by the surrounding situation sensor 112. The surrounding situation information SIT includes the camera image information IMG. The camera image information IMG includes an image imaged by the camera 2, that is, an image indicating the situation around the vehicle 1.

The vehicle state sensor 113 detects a state of the vehicle 1. The state of the vehicle 1 includes a speed (vehicle speed), an acceleration, a steering angle, a yaw rate, and the like of the vehicle 1. In addition, the state of the vehicle 1 includes a driving operation by a driver of the vehicle 1. The driving operation includes an acceleration operation, a braking operation, and a steering operation. The vehicle state information STA indicates the state of the vehicle 1 detected by the vehicle state sensor 113.

The communication device 120 communicates with the outside of the vehicle 1. For example, the communication device 120 communicates with an external device outside the vehicle 1 through a communication network.

The travel device 130 includes a steering device, a driving device, and a braking device. The steering device turns (i.e., changes a direction of) a wheel of the vehicle 1. For example, the steering device includes a power steering (EPS: Electric Power Steering) device. The driving device is a power source that generates a driving force. The driving device is exemplified by an engine and an electric motor. The braking device generates a braking force.

The control device (controller) 140 controls the in-vehicle device 100. The control device 140 is also called an ECU (Electronic Control Unit). The control device 140 includes a processor 150 and a memory device 160. A variety of processing is achieved by the processor 150 executing a control program stored in the memory device 160.

The control device 140 (i.e. the processor 150) executes information acquisition processing that acquires a variety of information. The variety of information is stored in the memory device 160.

For example, the control device 140 (i.e., the processor 150) acquires the driving environment information ENV from the sensor group 110 and stores the driving environment information ENV in the memory device 160.

Moreover, the control device 140 (i.e., the processor 150) acquires necessary map information MAP from a map database MAP_DB and stores the map information MAP in the memory device 160. The map information MAP includes the above-described traffic signal map information SG_MAP (see FIG. 15) in addition to a road map and a navigation map commonly used. The map database MAP_DB is stored in a memory device 300. The memory device 300 may be a part of the in-vehicle device 100, or may be installed outside the vehicle 1. When the map database MAP_DB is present outside the vehicle 1, the control device 140 accesses the map database MAP_DB through the communication device 120 to acquire necessary map information MAP.

Furthermore, the control device 140 (i.e., the processor 150) acquires necessary lamp pattern information PAT from the lamp pattern database PAT_DB and stores the lamp pattern information PAT in the memory device 160. The lamp pattern database PAT_DB is stored in a memory device 400. The memory device 400 may be a part of the in-vehicle device 100, or may be installed outside the vehicle 1. When the lamp pattern database PAT_DB is present outside the vehicle 1, the control device 140 accesses the lamp pattern database PAT_DB through the communication device 120 to acquire necessary lamp pattern information PAT.

The traffic signal detection unit 20, the pattern selection unit 30, and the lighting state recognition unit 40 shown in FIG. 17 are functional blocks of the processor 150. The traffic signal detection unit 20, the pattern selection unit 30, and the lighting state recognition unit 40 are achieved by the processor 150 executing the control program stored in the memory device 160.

The processor 150 executes the traffic signal detection processing (Step S20) based on the driving environment information ENV and the traffic signal map information SG_MAP to acquire the traffic signal detection information DTC. The traffic signal detection information DTC is stored in the memory device 160. Moreover, the processor 150 executes the lamp pattern selection processing (Step S30) based on the driving environment information ENV and the lamp pattern database PAT_DB to acquire the lamp pattern information PAT. The lamp pattern information PAT is stored in the memory device 160. Furthermore, the processor 150 executes the lighting state recognition processing (Step S40) based on the traffic signal detection information DTC and the lamp pattern information PAT to generate the recognition result information RES (Step S50). The recognition result information RES is stored in the memory device 160.

The processor 150 executes automated driving control of the vehicle 1 based on the recognition result information RES. The automated driving control includes at least one of steering control, acceleration control, and deceleration control. The processor 150 executes necessary vehicle control among the steering control, the acceleration control, and the deceleration control by appropriately actuating the travel device 130 (i.e., the steering device, the driving device, and the braking device).

3-2. Second Configuration Example

Figure 22:
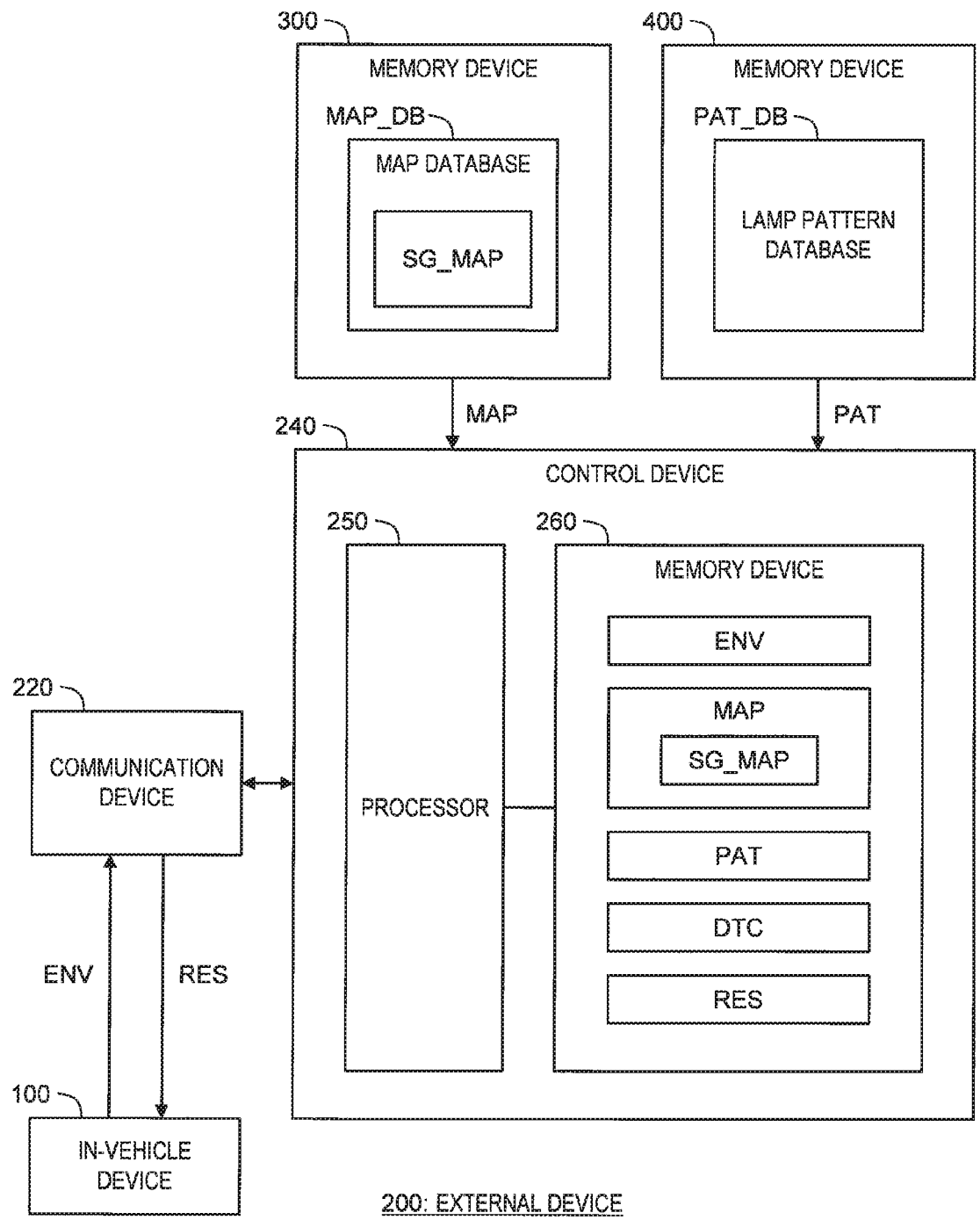
FIG. 22 is a block diagram showing a second configuration example of the traffic signal recognition system according to the embodiment of the present disclosure.

FIG. 22 is a block diagram showing a second configuration example of the traffic signal recognition system 10 according to the present embodiment. In the second configuration example, the traffic signal recognition system 10 is realized by an external device 200 outside the vehicle 1. For example, the external device 200 is a management server.

The external device 200 includes a communication device 220 and a control device (controller) 240.

The communication device 220 communicates with the outside of the external device 200. For example, the communication device 220 communicates with the in-vehicle device 100 (see FIG. 20) through a communication network.

The control device (controller) 240 controls the external device 200. The control device 240 includes a processor 250 and a memory device 260. A variety of processing is achieved by the processor 250 executing a control program stored in the memory device 260.

The control device 240 (i.e. the processor 250) executes information acquisition processing that acquires a variety of information. The variety of information is stored in the memory device 260.

For example, the control device 240 (i.e., the processor 250) acquires the driving environment information ENV from the in-vehicle device 100 through the communication device 220. The driving environment information ENV is stored in the memory device 260.

Moreover, the control device 240 (i.e., the processor 250) acquires necessary map information MAP from the map database MAP_DB and stores the map information MAP in the memory device 260. The map database MAP_DB is stored in the memory device 300. The memory device 300 may be a part of the external device 200, or may be installed outside the external device 200. When the map database MAP_DB is present outside the external device 200, the control device 240 accesses the map database MAP_DB through the communication device 220 to acquire necessary map information MAP.

Furthermore, the control device 240 (i.e., the processor 250) acquires necessary lamp pattern information PAT from the lamp pattern database PAT_DB and stores the lamp pattern information PAT in the memory device 260. The lamp pattern database PAT_DB is stored in the memory device 400. The memory device 400 may be a part of the external device 200, or may be installed outside the external device 200. When the lamp pattern database PAT_DB is present outside the external device 200, the control device 240 accesses the lamp pattern database PAT_DB through the communication device 220 to acquire necessary lamp pattern information PAT.

The traffic signal detection unit 20, the pattern selection unit 30, and the lighting state recognition unit 40 shown in FIG. 17 are functional blocks of the processor 250. The traffic signal detection unit 20, the pattern selection unit 30, and the lighting state recognition unit 40 are achieved by the processor 250 executing the control program stored in the memory device 260.

The processor 250 executes the traffic signal detection processing (Step S20) based on the driving environment information ENV and the traffic signal map information SG_MAP to acquire the traffic signal detection information DTC. The traffic signal detection information DTC is stored in the memory device 260. Moreover, the processor 250 executes the lamp pattern selection processing (Step S30) based on the driving environment information ENV and the lamp pattern database PAT_DB to acquire the lamp pattern information PAT. The lamp pattern information PAT is stored in the memory device 260. Furthermore, the processor 250 executes the lighting state recognition processing (Step S40) based on the traffic signal detection information DTC and the lamp pattern information PAT to generate the recognition result information RES (Step S50). The recognition result information RES is stored in the memory device 260.

The processor 250 may provide the in-vehicle device 100 of the recognition result information RES through the communication device 220. The processor 150 of the in-vehicle device 100 executes the automated driving control of the vehicle 1 based on the recognition result information RES.

3-3. Third Configuration Example

The functions of the traffic signal recognition system 10 (i.e., the traffic signal detection unit 20, the pattern selection unit 30, and the lighting state recognition unit 40) may be distributed to the processor 150 of the in-vehicle device 100 and the processor 250 of the external device 200. Information necessary for the processing may be distributed to the memory device 160 of the in-vehicle device 100, the memory device 260 of the external device 200, the memory device 300, and the memory device 400. Necessary information is shared by the in-vehicle device 100 and the external device 200 through communication.

The above-described first to third configuration examples can also be summarized as follows. That is, the traffic signal recognition system 10 includes one processor (i.e., the processor 150 or the processor 250) or a plurality of processors (i.e., the processor 150 and the processor 250). Moreover, the traffic signal recognition system 10 includes one or more memory devices (i.e., the memory devices 160, 260, 300, 400). The information necessary for the processing by the traffic signal recognition system 10 is stored in the one or more memory devices. The one or more processors access the one or more memory devices to acquire the necessary information and execute the above-described processing based on the acquired information.

4. Modification Examples

Next, some modification examples will be described. An overlapping description with the foregoing description (FIGS. 15 to 22) will be omitted as appropriate.

4-1. First Modification Example

Figure 23:
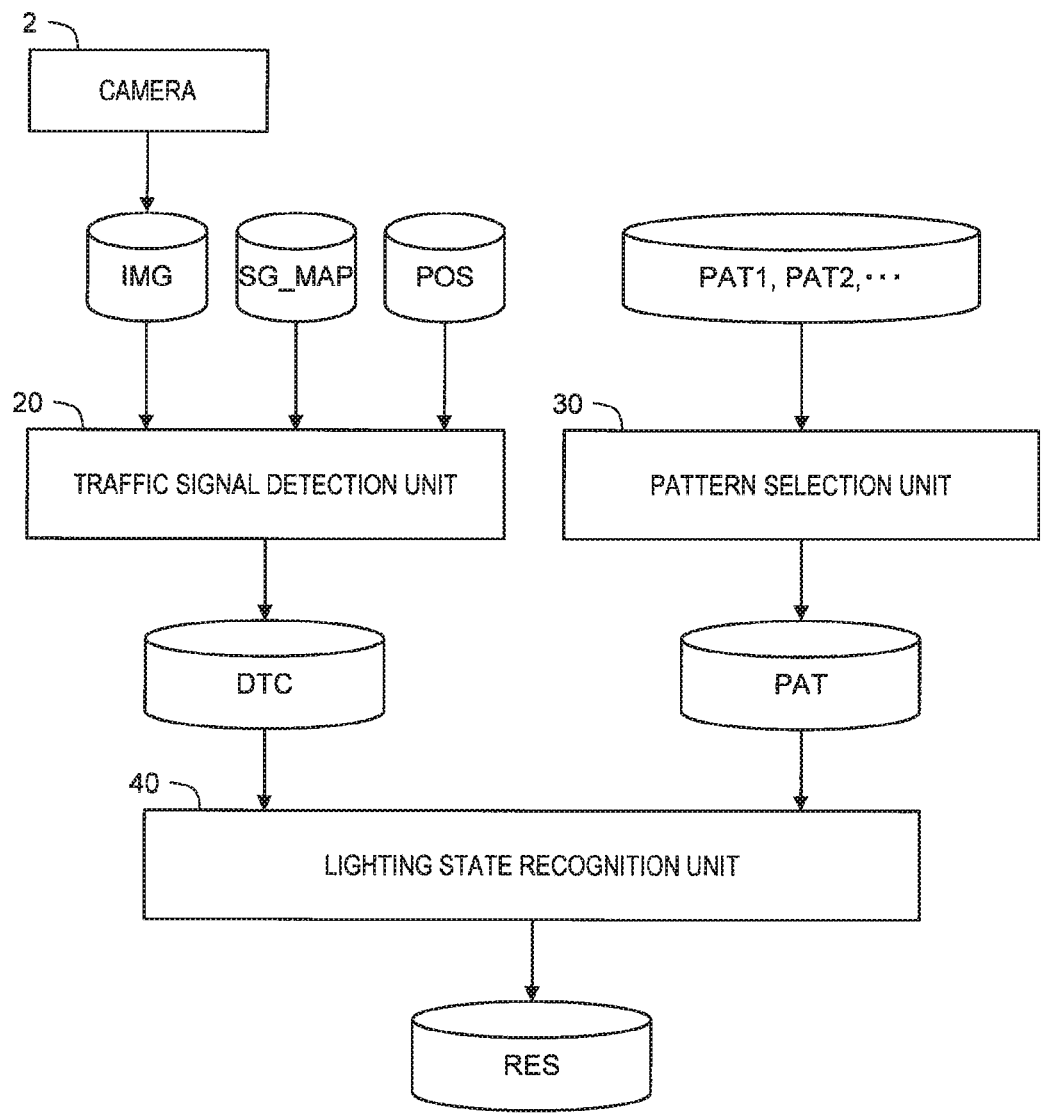
FIG. 23 is a block diagram showing a functional configuration example of the traffic signal recognition system according to a first modification example of the embodiment of the present disclosure.

FIG. 23 is a block diagram showing a functional configuration example of the traffic signal recognition system 10 according to a first modification example. In the first modification example, the lamp pattern database PAT_DB is omitted. Instead, a plurality of types of lamp pattern information PAT (PAT1, PAT2 . . . ) are stored in advance in a predetermined memory device (the memory device 160 or the memory device 260).

Figure 24:
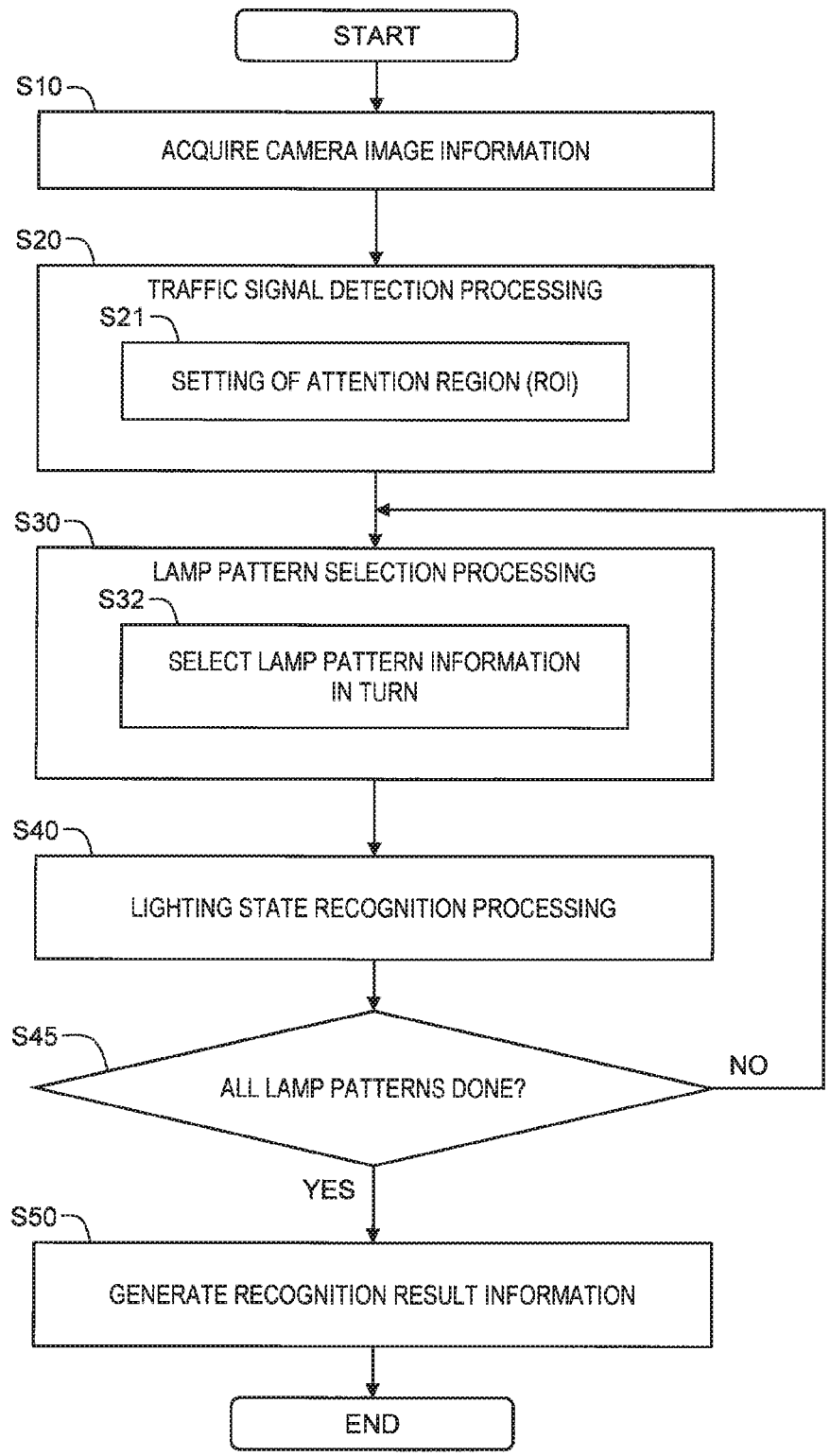
FIG. 24 is a flow chart showing processing by the traffic signal recognition system according to the first modification example of the embodiment of the present disclosure.

FIG. 24 is a flow chart showing the processing by the traffic signal recognition system 10 according to the first modification example. In Step S30, the pattern selection unit 30 selects the plurality of types of lamp pattern information PAT in turn (Step S32).

The lighting state recognition unit 40 uses the selected lamp pattern information PAT to execute the lighting state recognition processing (Step S40). The recognition result information RES is generated as "provisional recognition result information" and stored in the predetermined memory device. Step S30 and Step S40 are repeatedly executed until all types of the lamp pattern information PAT are used (Step S45; No). When the lighting state recognition processing is completed for all types of the lamp pattern information PAT (Step S45; Yes), the processing proceeds to Step S50.

In Step S50, the lighting state recognition unit 40 employs one with the highest consistency among a plurality of types of provisional recognition result information as the final recognition result information RES.

For example, when the "relative positional relationship" between the plurality of detected parts of the subject traffic signal SX is consistent with the "relative positional relationship" indicated by the lamp pattern information PAT, a first score is given. When the "appearance" of the detected part of the subject traffic signal SX is consistent with the "appearance" indicated by the lamp pattern information PAT, a second score is given. The second score becomes higher as the number of detected parts having the consistent appearance increases. Moreover, when not only the color but also the shape is consistent, the second score becomes further higher. Then, provisional recognition result information having the highest sum of the first score and the second score is employed as the final recognition result information RES.

4-2. Second Modification Example

Figure 25:
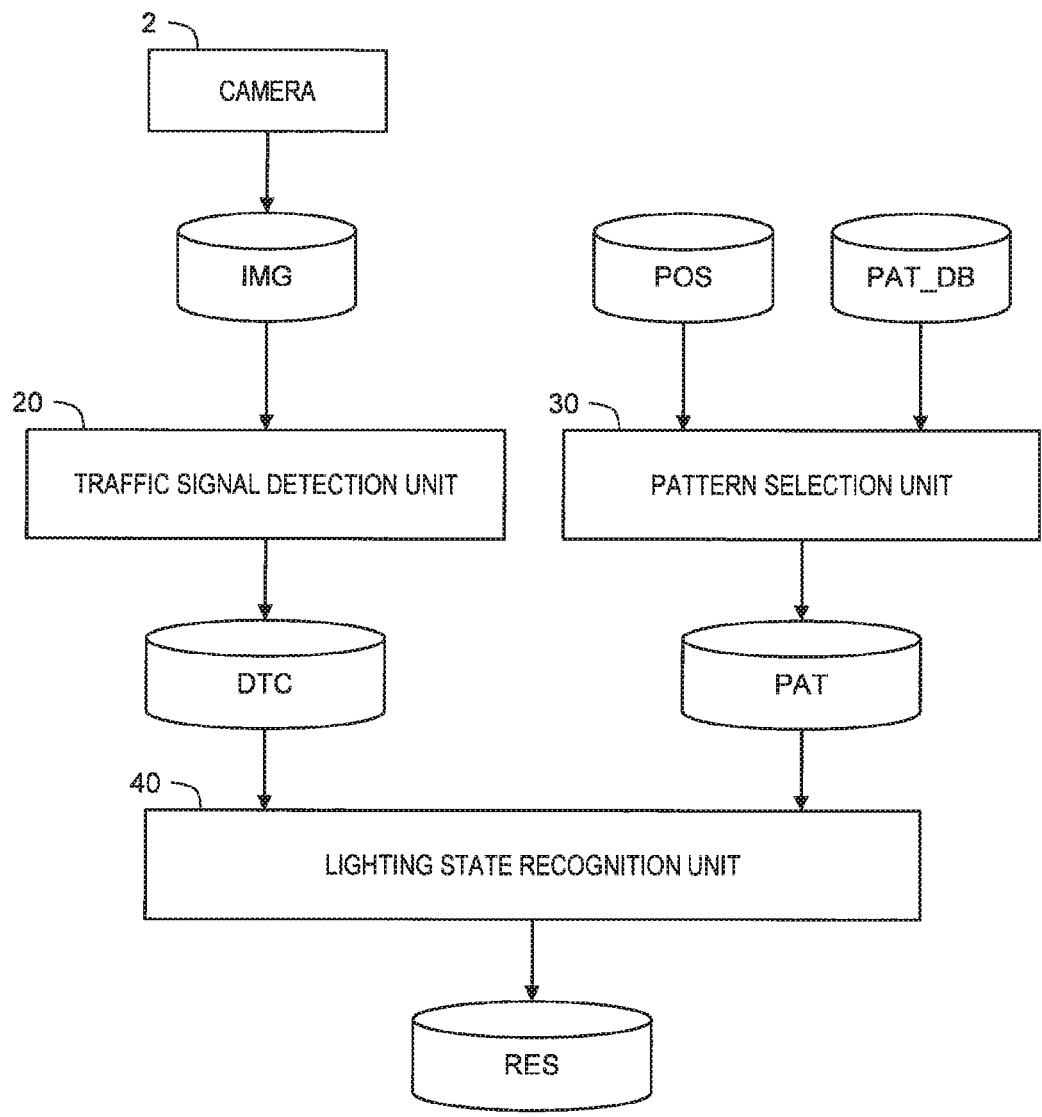
FIG. 25 is a block diagram showing a functional configuration example of the traffic signal recognition system according to a second modification example of the embodiment of the present disclosure.

FIG. 25 is a block diagram showing a functional configuration example of the traffic signal recognition system 10 according to a second modification example. In the second modification example, the traffic signal map information SG_MAP is omitted.

In the traffic signal detection processing (Step S20), the traffic signal detection unit 20 detects the traffic signal around the vehicle 1 without setting the attention region ROI. Although a search range extends, the traffic signal can be detected (extracted) from the image by a well-known image analysis method.

4-3. Third Modification Example

Figure 26:
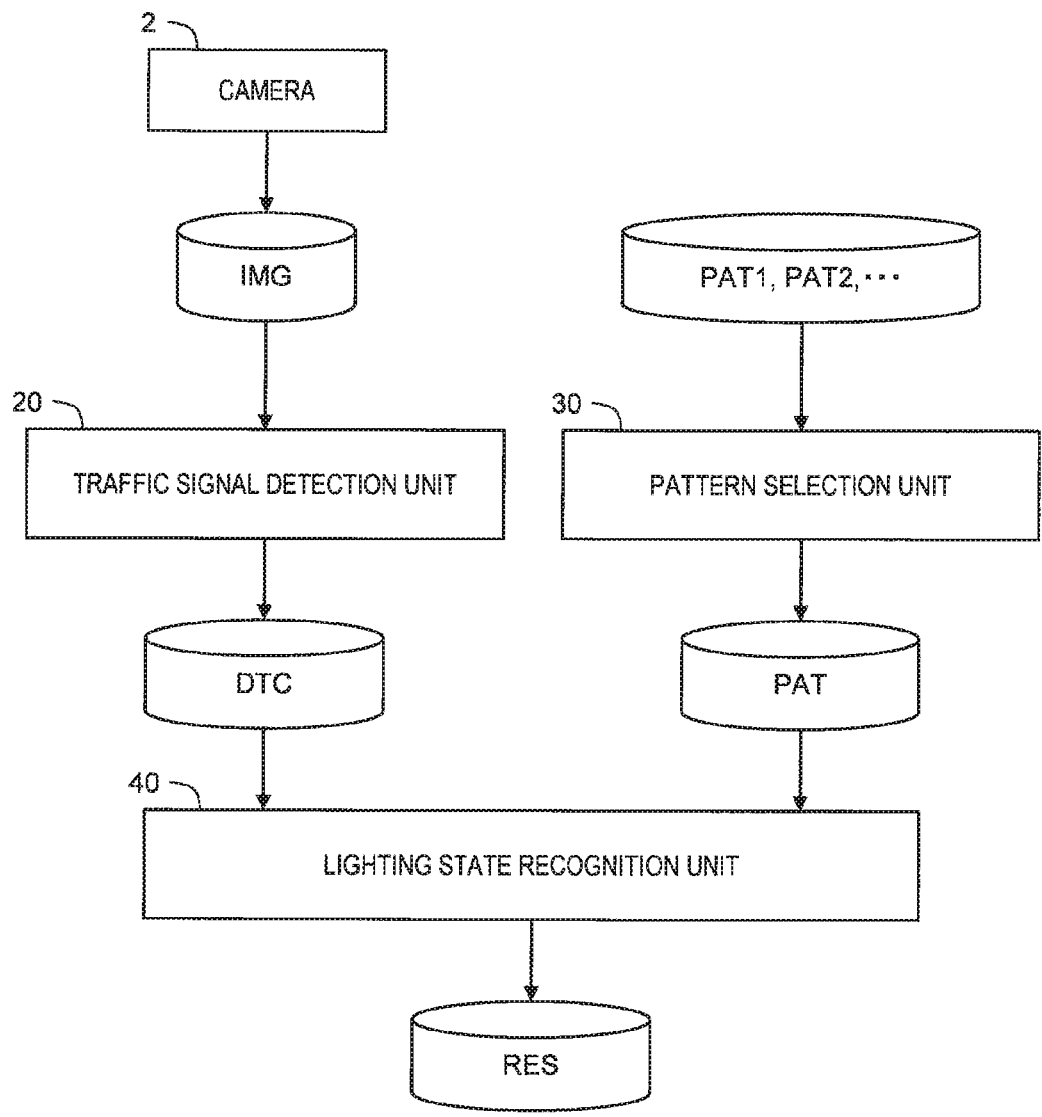
FIG. 26 is a block diagram showing a functional configuration example of the traffic signal recognition system according to a third modification example of the embodiment of the present disclosure.

FIG. 26 is a block diagram showing a functional configuration example of the traffic signal recognition system 10 according to a third modification example. In the third modification example, the lamp pattern database PAT_DB and the traffic signal map information SG_MAP are omitted. That is, the third modification example is a combination of the first modification example and the second modification example.

4-4. Fourth Modification Example

Figure 27:
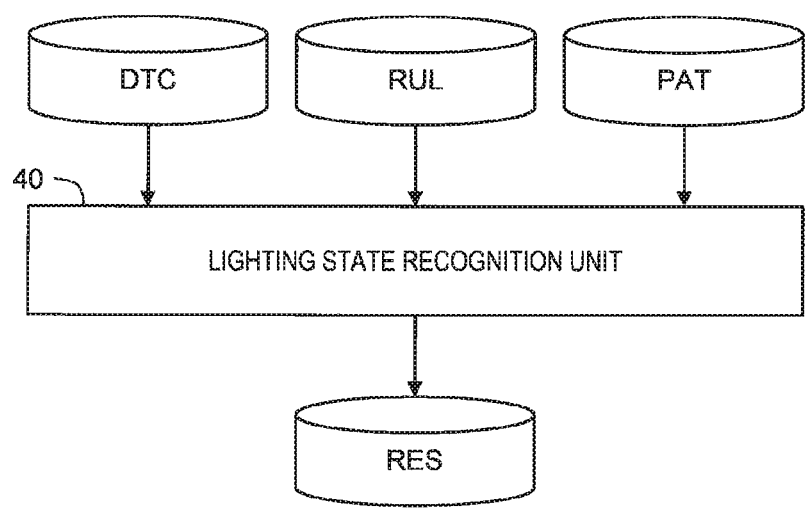
FIG. 27 is a block diagram showing a functional configuration example of the traffic signal recognition system according to a fourth modification example of the embodiment of the present disclosure.

FIG. 27 is a block diagram showing a functional configuration example of the traffic signal recognition system 10 according to a fourth modification example. Lighting rule information RUL is stored in advance in a predetermined memory device (the memory device 160 or the memory device 260). The lighting rule information RUL indicates a rule about the lighting status of the traffic signal. For example, in the case of traffic signals in Japan, there is a rule that "one circular lamp part is always lighted."

The lighting state recognition unit 40 executes the lighting state recognition processing (Step S40). The recognition result information RES is generated as "provisional recognition result information" and stored in the predetermined memory device. Then, the lighting state recognition unit 40 checks whether or not the provisional recognition result information is consistent with the rule indicated by the lighting rule information RUL.

If only one circular lamp part is lighted, the provisional recognition result information is valid. In this case, the lighting state recognition unit 40 employs the provisional recognition result information as the final recognition result information RES.

On the other hand, if no circular lamp part is lighted at all, or if two or more circular lamp parts are lighted, the provisional recognition result information is invalid. In this case, the lighting state recognition unit 40 discards the provisional recognition result information and maintains the previous valid recognition result information RES.

According to the fourth modification example, false recognition of the lighting state of the subject traffic signal SX is suppressed. For example, false recognition due to pseudo lighting of the subject traffic signal SX is suppressed.

5. Others

5-1. Shade

In some cases, a shade is attached to the top of the lamp part of the traffic signal. The lamp pattern information PAT may include "presence or absence of shade" as attribute information of the lamp part.

For example, a shade is attached to a green circular lamp part (green traffic signal). When no circular lamp part is detected at all, the lighting state recognition unit 40 assumes that the green circular lamp part is actually lighted and executes the lighting state recognition processing (Step S40).

5-2. Flashing Traffic Signal

In some cases, the lamp part of the traffic signal flashes. The lamp pattern information PAT may include "flashing" as attribute information of the lamp part.

For example, let us consider a case where a yellow circular lamp part (yellow traffic signal) flashes. The lamp pattern information PAT indicates "flashing" as the attribute information of the yellow circular lamp part. If the detected part of the subject traffic signal SX is flashing, the lighting state recognition unit 40 determines that the detected part corresponds to the yellow circular lamp part.

What is claimed is:

1. A traffic signal recognition system applied to a vehicle and comprising:
   one or more memory devices in which camera image information and lamp pattern information are stored; and
   one or more processors, wherein
   the camera image information includes an image that is imaged by a camera installed on the vehicle and indicates a situation around the vehicle,
   the lamp pattern information, which is information on a traffic signal having a plurality of lamp parts, indicates a relative positional relationship between the plurality of lamp parts and an appearance of each of the plurality of lamp parts when lighted,
   the one or more processors are configured to:
      detect a subject traffic signal around the vehicle based on the camera image information to acquire traffic signal detection information that indicates at least an appearance of each of a plurality of detected parts of the subject traffic signal; and
      execute lighting state recognition processing that recognizes a lighting state of the subject traffic signal by comparing the traffic signal detection information with the lamp pattern information, and
   in the lighting state recognition processing, the one or more processors recognize a lighting state of the plurality of lamp parts that is consistent with the appearance of each of the plurality of detected parts of the subject traffic signal as the lighting state of the subject traffic signal.

2. The traffic signal recognition system according to claim 1, wherein
   the traffic signal detection information further indicates a relative positional relationship between the plurality of detected parts of the subject traffic signal, and
   in the lighting state recognition processing, the one or more processors recognize a lighting state of the plurality of lamp parts that is consistent with both the appearance of each of the plurality of detected parts of the subject traffic signal and the relative positional relationship between the plurality of detected parts as the lighting state of the subject traffic signal.

3. The traffic signal recognition system according to claim 2, wherein
   the appearance of each of the plurality of detected parts of the subject traffic signal includes whether lighted or not.

4. The traffic signal recognition system according to claim 1, wherein
   the appearance of each of the plurality of lamp parts when lighted includes a color, and
   the appearance of each of the plurality of detected parts of the subject traffic signal includes a color.

5. The traffic signal recognition system according to claim 4, wherein
   the appearance of each of the plurality of lamp parts when lighted further includes a shape, and
   the appearance of each of the plurality of detected parts of the subject traffic signal further includes a shape when lighted.

6. The traffic signal recognition system according to claim 1, wherein
   a lamp pattern database indicates a position of the traffic signal in an absolute coordinate system and the lamp pattern information which are associated with each other,
   position information indicates a position and an orientation of the vehicle or the camera in the absolute coordinate system, and
   based on the lamp pattern database and the position information, the one or more processors identify the traffic signal expected to be imaged by the camera as the subject traffic signal and select the lamp pattern information associated with the position of the subject traffic signal from the lamp pattern database.

* * * * *